United States Patent
Kim et al.

(10) Patent No.: US 12,068,824 B2
(45) Date of Patent: *Aug. 20, 2024

(54) METHOD AND APPARATUS FOR TRANSMITTING CHANNEL STATE INFORMATION

(71) Applicants: HYUNDAI MOTOR COMPANY, Seoul (KR); Kia Corporation, Seoul (KR)

(72) Inventors: Sun Woo Kim, Seoul (KR); Min Soo Jeong, Seoul (KR); Sung Jin Kim, Seoul (KR); Jeong Wan Kang, Seoul (KR); Yong Min Song, Seoul (KR); Chung Hoon Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/054,351

(22) Filed: Nov. 10, 2022

(65) Prior Publication Data

US 2023/0085046 A1 Mar. 16, 2023

Related U.S. Application Data

(63) Continuation of application No. 17/052,919, filed as application No. PCT/KR2019/005910 on May 17, 2019, now Pat. No. 11,546,034.

(30) Foreign Application Priority Data

May 17, 2018 (KR) .................. 10-2018-0056360
May 17, 2018 (KR) .................. 10-2018-0056363
(Continued)

(51) Int. Cl.
*H04B 7/06* (2006.01)
*H04B 17/318* (2015.01)
(Continued)

(52) U.S. Cl.
CPC ......... *H04B 7/0626* (2013.01); *H04B 17/318* (2015.01); *H04L 5/0051* (2013.01);
(Continued)

(58) Field of Classification Search
CPC ................ H04B 7/0626; H04B 17/318; H04B 7/06952; H04B 17/327; H04L 5/0051;
(Continued)

(56) References Cited

U.S. PATENT DOCUMENTS

2018/0062724 A1 3/2018 Onggosanusi et al.
2018/0083680 A1 3/2018 Guo et al.
(Continued)

FOREIGN PATENT DOCUMENTS

CN 104396160 A 3/2015
CN 105007148 A 10/2015
(Continued)

OTHER PUBLICATIONS

3GPP TSG-RAN WG1 Meeting #88bis R1-1705959 Spokane, WA, USA, Apr. 3-7, 2017 Title: On beam grouping and reporting.
(Continued)

*Primary Examiner* — Rownak Islam
(74) *Attorney, Agent, or Firm* — MORGAN, LEWIS & BOCKIUS LLP

(57) ABSTRACT

A method of a terminal for transmitting channel state information for one or more beams comprises the steps of: determining whether group-based beam reporting is configured based on channel state information (CSI) reporting configuration information; measuring reference signal received power (RSRP) for one or more channel state
(Continued)

information reference signals (CSI-RS) received through one or more CSI-RS resources; and transmitting, to a base station, the channel state information including a value in a table configured in advance based on whether the group-based beam reporting is configured and one or more CSI-RS RSRP measurement results obtained by the measurement.

11 Claims, 22 Drawing Sheets

(30) Foreign Application Priority Data

| | | |
|---|---|---|
| May 17, 2018 | (KR) | 10-2018-0056366 |
| May 17, 2018 | (KR) | 10-2018-0056370 |
| May 17, 2018 | (KR) | 10-2018-0056371 |
| May 16, 2019 | (KR) | 10-2019-0057396 |

(51) Int. Cl.
| | |
|---|---|
| *H04L 5/00* | (2006.01) |
| *H04W 24/10* | (2009.01) |
| *H04W 52/36* | (2009.01) |
| *H04W 72/044* | (2023.01) |
| *H04W 72/23* | (2023.01) |

(52) U.S. Cl.
CPC ......... *H04W 24/10* (2013.01); *H04W 52/362* (2013.01); *H04W 52/365* (2013.01); *H04W 72/0473* (2013.01); *H04W 72/23* (2023.01)

(58) Field of Classification Search
CPC . H04W 24/10; H04W 52/362; H04W 52/365; H04W 72/0473; H04W 72/23
USPC ......................................................... 370/329
See application file for complete search history.

(56) References Cited

U.S. PATENT DOCUMENTS

| | | | |
|---|---|---|---|
| 2018/0368142 A1 | 12/2018 | Liou | |
| 2019/0190582 A1 | 6/2019 | Guo | |
| 2019/0215136 A1 | 7/2019 | Zhou | |
| 2019/0215781 A1 | 7/2019 | Jeon | |
| 2019/0296854 A1 | 9/2019 | Kubo | |
| 2019/0297603 A1* | 9/2019 | Guo | H04L 5/0053 |
| 2020/0099435 A1 | 3/2020 | Kang | |

FOREIGN PATENT DOCUMENTS

| | | |
|---|---|---|
| CN | 105052048 A | 11/2015 |
| CN | 107431522 A | 12/2017 |
| CN | 107615856 A | 1/2018 |
| CN | 107666340 A | 2/2018 |
| CN | 107771378 A | 3/2018 |
| CN | 107980209 A | 5/2018 |
| KR | 2016514429 A | 5/2016 |
| KR | 1020180135851 A | 12/2018 |
| KR | 1020200037440 A | 4/2020 |
| WO | 2017026794 A1 | 2/2017 |
| WO | 2017039166 A1 | 3/2017 |
| WO | 2017/209505 A1 | 12/2017 |
| WO | 2017222329 A1 | 12/2017 |
| WO | 2018/030841 A1 | 2/2018 |
| WO | 2018085601 A1 | 5/2018 |

OTHER PUBLICATIONS

3GPP TSG RAN WG1 Meeting #90 R1-1712297 Prague, Czechia, Aug. 21-25, 2017 Title: Discussion on beam measurement and reporting.
3GPP TSG RAN WG1 Meeting #90 R1-1713050 Prague, Czech Rep. Aug. 21-25, 2017 Title: On L1-RSRP report for beam management.
3GPP TSG RAN WG1 Meeting #90bis R1-1717472 Prague, CZ, Oct. 9-13, 2017 Title: Discussion on beam measurement, beam reporting and beam indication.
3GPP TSG RAN WG1 Meeting AH 1801 R1-1800697 Vancouver, Canada, Jan. 22-26, 2018 Title: Corrections for CSI reporting.
3GPP TSG RAN WG1 Meeting AH 1801 R1-1801187 Vancouver, Canada, Jan. 22-26, 2018 Title: Feature lead summary 3 of beam measurement and reporting.
3GPP TSG RAN WG1 Meeting #92 R1-1802562 Athens, Greece, Feb. 26-Mar. 2, 2018 Title: Remaining Details on Beam Measurement and Reporting.
3GPP TSG-RAN1 Meeting #92bis R1-1805777 Sanya, P.R. China, Apr. 16-20, 2018 Title: draftCR to 38.214 capturing the RAN1#92bis meeting agreements.
Nokia 'Remaining Details on Beam Measurement and Reporting', R1-1802562, 3GPP TSG RAN WG1 #92, Athens, Greece, Feb. 16, 2018.
Nokia, 'draftCR to 38.214 capturing the RAN1#92bis meeting agreements', R1-1805777, 3GPP TSG RAN WG1 #92bis, Sanya, P.R. China, May 1, 2018.
Samsung, 'Remaining Issues on CSI measurement', R1-1806712, 3GPP TSG RAN WG1 #93, Busan, Korea, May 11, 2018.
LENOVO 'Remaining details of beam reporting', R1-1806353, 3GPP TSG RAN WG1 #93, Busan, Korea, May 11, 2018.
Ericsson, 'RRC configuration for CSI-MeasConfig', R2-1713738, 3GPP TSG RAN WG2 #100, Reno, Nevada, Nov. 17, 2017.
International Search Report issued in PCT Application No. PCT/KR2019/005910 on Aug. 27, 2019.
Samsung, R1-1717610, Discussion on Tx beam grouping configuration for multi-panel TRP and multi-TRP, 3GPP TSG RAN WG1 #90bis, (Oct. 2, 2017.).
Notice of Allowance issued in corresponding Chinese Patent Application No. 201980033263.3 dated Dec. 22, 2023, with English translation.
Author Unknown, "Feature lead summary 1 of beam measurement and reporting", 3GPP TSG RAN WG1 Meeting AH 1801, Vancouver, Canada, Jan. 22-26, 2018, R1-1801006, pp. 1-12.
Author Unknown, "Discussion on Beam Measurement and Reporting for Beam Management", 3GPP TSG-RAN WG4 Meeting #87, Busan, Korea, May 21-25, 2018, R4-1807282, pp. 1-2.

* cited by examiner

FIG.9

CSI-ReportConfig information element

```
groupBasedBeamReporting        CHOICE {
    enabled                    NULL,
    disabled                   SEQUENCE {
        nrofReportedRS             ENUMERATED {n1, n2, n3, n4}
    }
},
```

FIG.10

| 7-bit RSRP | The RSRP range |
|---|---|
| 0000000 | RSRP <= -140dBm |
| 0000001 | -140 dBm < RSRP <=-139 dBm |
| 0000010 | -139 dBm < RSRP <=-138 dBm |
| ... | ... |
| 1100000 | -45 dBm < RSRP <=-44 dBm |
| 1100001 | RSRP > -44 dBm |
| 1100011 | Reserved |
| ... | ... |
| 1111111 | Reserved |

FIG.11

| 6-bit RSRP | The RSRP range |
|---|---|
| 0000000 | RSRP <= −140dBm |
| 0000001 | −140 dBm < RSRP <=−138 dBm |
| 0000010 | −138 dBm < RSRP <=−136 dBm |
| ... | ... |
| 1100000 | −46 dBm < RSRP <=−44 dBm |
| 1100001 | RSRP > −44 dBm |
| 1100011 | Reserved |
| ... | ... |
| 1111111 | Reserved |

FIG.12

| 7-bit RSRP | The RSRP range |
|---|---|
| 0000000 | RSRP <= -140dBm |
| 0000001 | -140 dBm < RSRP <=-139 dBm |
| ... | ... |
| 0011110 | -111 dBm < RSRP <=-110 dBm |
| 0011111 | -110 dBm < RSRP <=-109.5 dBm |
| ... | ... |
| 1011010 | -80.5 dBm < RSRP <=-80 dBm |
| 1011011 | -80 dBm < RSRP <=-79 dBm |
| ... | ... |
| 1111110 | -45 dBm < RSRP <=-44 dBm |
| 1111111 | RSRP > -44 dBm |

FIG.13

| 7bits Reported value | Measured quantity value (L3 SS-RSRP) | Measured quantity value (L1 SS-RSRP and CSI-RSRP) | Unit |
|---|---|---|---|
| RSRP_0 | SS-RSRP<-156 | Not valid | dBm |
| RSRP_1 | -156≤ SS-RSRP<-155 | Not valid | dBm |
| RSRP_2 | -155≤ SS-RSRP<-154 | Not valid | dBm |
| RSRP_3 | -154≤ SS-RSRP<-153 | Not valid | dBm |
| RSRP_4 | -153≤ SS-RSRP<-152 | Not valid | dBm |
| RSRP_5 | -152≤ SS-RSRP<-151 | Not valid | dBm |
| RSRP_6 | -151≤ SS-RSRP<-150 | Not valid | dBm |
| RSRP_7 | -150≤ SS-RSRP<-149 | Not valid | dBm |
| RSRP_8 | -149≤ SS-RSRP<-148 | Not valid | dBm |
| RSRP_9 | -148≤ SS-RSRP<-147 | Not valid | dBm |
| RSRP_10 | -147≤ SS-RSRP<-146 | Not valid | dBm |
| RSRP_11 | -146≤ SS-RSRP<-145 | Not valid | dBm |
| RSRP_12 | -145≤ SS-RSRP<-144 | Not valid | dBm |
| RSRP_13 | -144≤ SS-RSRP<-143 | Not valid | dBm |
| RSRP_14 | -143≤ SS-RSRP<-142 | Not valid | dBm |
| RSRP_15 | -142≤ SS-RSRP<-141 | Not valid | dBm |
| RSRP_16 | -141≤SS-RSRP<-140 | RSRP<-140 | dBm |
| RSRP_17 | -140≤SS-RSRP<-139 | -140≤RSRP<-139 | dBm |
| RSRP_18 | -139≤SS-RSRP<-138 | -139≤RSRP<-138 | dBm |
| ... | ... | ... | ... |
| RSRP_111 | -46≤SS-RSRP<-45 | -46≤RSRP<-45 | dBm |
| RSRP_112 | -45≤SS-RSRP<-44 | -45≤ RSRP<-44 | dBm |
| RSRP_113 | -44≤SS-RSRP<-43 | -44≤ RSRP | dBm |
| RSRP_114 | -43≤SS-RSRP<-42 | Not valid | dBm |
| RSRP_115 | -42≤SS-RSRP<-41 | Not valid | dBm |
| RSRP_116 | -41≤SS-RSRP<-40 | Not valid | dBm |
| RSRP_117 | -40≤SS-RSRP<-39 | Not valid | dBm |
| RSRP_118 | -39≤SS-RSRP<-38 | Not valid | dBm |
| RSRP_119 | -38≤SS-RSRP<-37 | Not valid | dBm |
| RSRP_120 | -37≤SS-RSRP<-36 | Not valid | dBm |
| RSRP_121 | -36≤SS-RSRP<-35 | Not valid | dBm |
| RSRP_122 | -35≤SS-RSRP<-34 | Not valid | dBm |
| RSRP_123 | -34≤SS-RSRP<-33 | Not valid | dBm |
| RSRP_124 | -33≤SS-RSRP<-32 | Not valid | dBm |
| RSRP_125 | -32≤SS-RSRP<-31 | Not valid | dBm |
| RSRP_126 | -31≤SS-RSRP | Not valid | dBm |
| RSRP_127 (Note) | Infinity | Infinity | dBm |

FIG.14

| Beam group #0 | | ... | Beam group #(L-1) | |
|---|---|---|---|---|
| Beam ID | RSRP | ... | Beam ID | RSRP |
| Beam $K_0^0$ | $P_0^0$ | ... | Beam $K_0^{L-1}$ | $P_0^{L-1}$ |
| Beam $K_1^0$ | $P_1^0$ | ... | Beam $K_1^{L-1}$ | $P_1^{L-1}$ |
| ... | ... | ... | ... | ... |
| Beam $K_{Q-1}^0$ | $P_{Q-1}^0$ | ... | Beam $K_{Q-1}^{L-1}$ | $P_{Q-1}^{L-1}$ |

*FIG. 15*

| Beam group #0 | | ... | Beam group #(L-1) | |
|---|---|---|---|---|
| Beam ID | RSRP | ... | Beam ID | RSRP |
| Beam $K_0^0$ | $P_0^0$ | ... | Beam $K_0^{L-1}$ | $P_0^{L-1}$ |
| Beam $K_1^0$ | $f_1^0(P_0^0 - P_1^0)$ | ... | Beam $K_1^{L-1}$ | $f_1^{L-1}(P_0^{L-1} - P_1^{L-1})$ |
| ... | ... | ... | ... | ... |
| Beam $K_{Q-1}^0$ | $f_{Q-1}^0(P_0^0 - P_{Q-1}^0)$ | ... | Beam $K_{Q-1}^{L-1}$ | $f_{Q-1}^{L-1}(P_0^{L-1} - P_{Q-1}^{L-1})$ |

FIG. 16

| Report Differential RSRP Value | Difference from the reference |
|---|---|
| 0000 | Abnormal state |
| 0001 | 0*Step size |
| 0010 | −1*Step size |
| ... | ... |
| 1101 | −12*Step size |
| 1110 | −13*Step size |
| 1111 | −14*Step size |

1600

| Report Differential RSRP Value | Difference from the reference |
|---|---|
| 00000 | Abnormal state |
| 00001 | 0*Step size |
| 00010 | −1*Step size |
| ... | ... |
| 11101 | −28*Step size |
| 11110 | −29*Step size |
| 11111 | −30*Step size |

| 4bits Reported value | Measured quantity value (difference in measured RSRP from strongest RSRP) | Unit |
|---|---|---|
| DIFFRSRP_0 | $0 \geq \Delta RSRP > -2$ | dB |
| DIFFRSRP_1 | $-2 \geq \Delta RSRP > -4$ | dB |
| DIFFRSRP_2 | $-4 \geq \Delta RSRP > -6$ | dB |
| DIFFRSRP_3 | $-6 \geq \Delta RSRP > -8$ | dB |
| DIFFRSRP_4 | $-8 \geq \Delta RSRP > -10$ | dB |
| DIFFRSRP_5 | $-10 \geq \Delta RSRP > -12$ | dB |
| DIFFRSRP_6 | $-12 \geq \Delta RSRP > -14$ | dB |
| DIFFRSRP_7 | $-14 \geq \Delta RSRP > -16$ | dB |
| DIFFRSRP_8 | $-16 \geq \Delta RSRP > -18$ | dB |
| DIFFRSRP_9 | $-18 \geq \Delta RSRP > -20$ | dB |
| DIFFRSRP_10 | $-20 \geq \Delta RSRP > -22$ | dB |
| DIFFRSRP_11 | $-22 \geq \Delta RSRP > -24$ | dB |
| DIFFRSRP_12 | $-24 \geq \Delta RSRP > -26$ | dB |
| DIFFRSRP_13 | $-26 \geq \Delta RSRP > -28$ | dB |
| DIFFRSRP_14 | $-28 \geq \Delta RSRP > -30$ | dB |
| DIFFRSRP_15 | $-30 \geq \Delta RSRP$ | dB |

METHOD AND APPARATUS FOR TRANSMITTING CHANNEL STATE INFORMATION

CROSS-REFERENCE TO RELATED APPLICATION

This application is a continuation of U.S. application Ser. No. 17/052,919 filed on Nov. 4, 2020, which is a National Stage Entry of PCT International Application No. PCT/KR2019/005910, which was filed on May 17, 2019, and which claims priority from and the benefit of Korean Patent Application No. 10-2018-0056360 filed with the Korean Intellectual Property Office on May 17, 2018, Korean Patent Application No. 10-2018-0056363 filed with the Korean Intellectual Property Office on May 17, 2018, Korean Patent Application No. 10-2018-0056370 filed with the Korean Intellectual Property Office on May 17, 2018, Korean Patent Application No. 10-2018-0056371 filed with the Korean Intellectual Property Office on May 17, 2018, Korean Patent Application No. 10-2018-0056366 filed with the Korean Intellectual Property Office on May 17, 2018, and Korean Patent Application No. 10-2019-0057396 filed with the Korean Intellectual Property Office on May 16, 2018, the entire contents of which are incorporated herein by reference. In addition, this non-provisional application claims priorities in countries other than the U.S. for the same reason based on the Korean Patent Applications, the entire contents of which are hereby incorporated by reference.

TECHNICAL FIELD

The present disclosure relates to terminals, base stations, and methods for transmitting and receiving channel state information.

BACKGROUND ART

As communication systems have been developed, various types of wireless terminals have been introduced to consumers such as companies and individuals.

Mobile communication systems employing technologies related to 3rd generation partnership project (3GPP), such as long term evolution (LTE), LTE-Advanced, fifth generation (5G), or the like, have been designed for transmitting and receiving a large amount of various data, such as video data, radio data, etc. at a high speed, beyond voice-oriented communication.

After LTE-Advanced, technologies for next generation radio access networks have been developed for enabling a terminal such as a user equipment as in the 3GPP to transmit and receive a larger amount of data and provide a higher quality of service (QoS). For example, work on development of a so-called 5G network by the 3GPP is in progress.

In particular, in order to perform communication using a high frequency band and provide high rate data transmission and reception services to more terminals, the 5G network employs an analog beamforming technology. In the case of analog beamforming, a beam operation related technology is needed for forming an optimal beam pair between a base station and a terminal through beam sweeping transmission and beam repetition transmission of the base station and the terminal.

In this case, in order for a base station to identify a channel state of one or more beams, a terminal is needed to measure a channel transmitted in the form of multiple beams, and transmits measurement information on a result of the measurement to the base station. At this time, it should be noted that in a situation where multiple beams are operated, overhead of an associated system may increase due to the increase of signals needed to transmit measurement results for beams to the base station.

Accordingly, it is desired to provide a new method for enabling a terminal to transmit channel state information for one or more beams to a base station.

DETAILED DESCRIPTION OF THE INVENTION

Technical Problem

In accordance with embodiments of the present disclosure, a method is provided for enabling a terminal to transmit channel state information for one or more beams to a base station.

Technical Solution

In one aspect of the present disclosure, according to embodiments, a method of a terminal is provided for transmitting channel state information for one or more beams, the method comprising: receiving channel state information (CSI) reporting configuration information from a base station; determining whether group-based beam reporting is configured based on the CSI reporting configuration information; measuring reference signal received power (RSRP) for one or more CSI-RSs received through one or more CSI-RS resources; and transmitting, to the base station, channel state information including a value in a table configured in advance based on whether the group-based beam reporting is configured and one or more CSI-RS RSRP measurement results obtained by the measurement.

In another aspect of the present disclosure, according to embodiments, a method of a base station is provided for receiving channel state information for one or more beams, the method comprising: transmitting CSI reporting configuration information to a terminal; and when it is determined that group-based beam reporting is used based on the CSI reporting configuration information, receiving channel state information including two or more CSI-RS RSRP measurement results, the two or more CSI-RS RSRP measurement results being included in the channel state information as values in a table configured in advance in the terminal, the pre-configured table including a table for indicating one of CSI-RS RSRP measurement results and a table for indicating at least one differential CSI-RS RSRP measurement result.

In further another aspect of the present disclosure, according to embodiments, a terminal is provided for transmitting channel state information for one or more beams, the terminal comprising: a receiver receiving CSI reporting configuration information from a base station; a controller determining whether group-based beam reporting is configured based on the CSI reporting configuration information, and measuring RSRP for one or more CSI-RSs received through one or more CSI-RS resources; and a transmitter transmitting, to the base station, channel state information including a value in a table configured in advance based on whether the group-based beam reporting is configured and one or more CSI-RS RSRP measurement results.

Effects of the Invention

In accordance with embodiments of the present disclosure, it is possible to provide an effect of transmitting channel state information, while reducing the load of an associated system.

BRIEF DESCRIPTION OF THE DRAWINGS

FIG. 9 is a diagram illustrating an information element of CSI reporting configuration information according to embodiments of the present disclosure.

FIGS. 10 to 13 are diagrams illustrating examples of RSRP tables configured in advance according to embodiments of the present disclosure.

FIGS. 14 and 15 are diagrams illustrating group-based beam reporting operation for multiple beams according to embodiments of the present disclosure.

FIGS. 16 and 17 are diagrams illustrating examples of differential RSRP tables according to embodiments of the present disclosure.

BEST MODE FOR CARRYING OUT THE INVENTION

Figure 1:
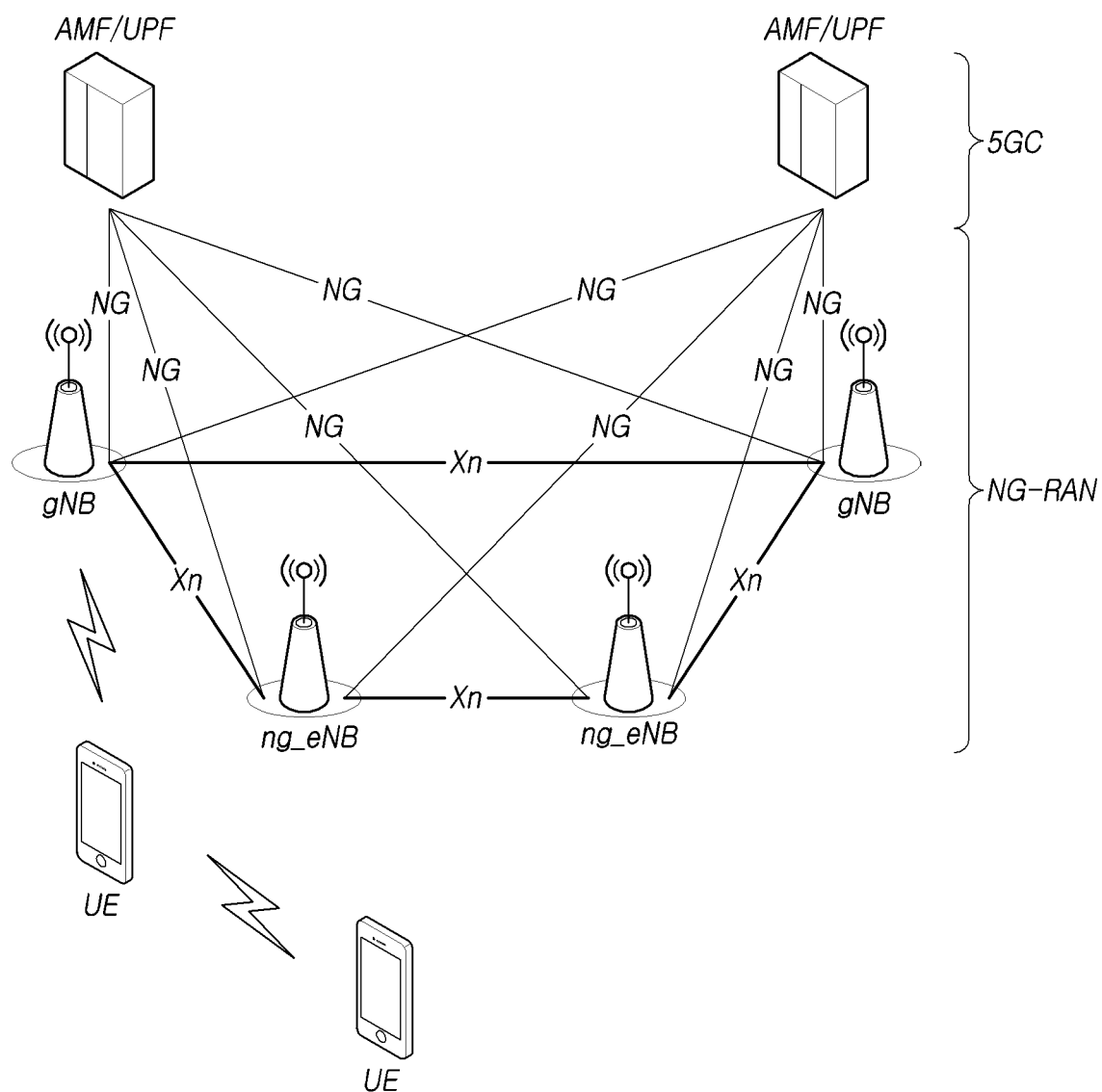
FIG. 1 is a diagram schematically illustrating a structure of a NR wireless communication system according to embodiments of the present disclosure.

Hereinafter, the present preferred embodiments of the disclosure will be described in detail with reference to the accompanying drawings. In denoting elements of the drawings by reference numerals, the same elements will be referenced by the same reference numerals even when the elements are illustrated in different drawings. Further, in the following description of the present disclosure, detailed discussions on known functions and configurations incorporated herein may be omitted when it is desired to focus on the subject matter of the present disclosure. The terms such as "including", "having", "containing", "comprising of", and "consist of" used herein are generally intended to allow other components to be added unless the terms are used with the term "only". Singular forms used herein are intended to include plural forms unless the context clearly indicates otherwise.

Further, the terms "first", "second", "A", "B", "(a)", "(b)", or the like may be used to describe elements included in embodiments of the present disclosure. Each of the terms is not used to define essence, order, sequence, or number of an element, but is used merely to distinguish the corresponding element from another element.

Herein, situations in which two or more elements included in embodiments of the present disclosure are connected, combined, coupled, contacted, or the like may include not only directly or physically connecting, combining, coupling, or contacting between two or more elements, but interposing of another element between the two or more elements. Here, the another element may be included in one or more of the two or more elements connected, combined, coupled, or contacted (to) one another.

In describing time relative terms with reference to elements, operations, steps, or processes included in embodiments of the present disclosure, situations in which "after", "subsequent to", "next to", "before", or the like is used to describe a temporal sequential relationship or a flow sequential relationship between events, operations, or the like are generally intended to include events, situations, cases, operations, or the like that do not occur consecutively unless the terms, such as "directly", "immediately", or the like, are used.

Meanwhile, when numerical values for elements included in embodiments of the present disclosure or their associated information (e.g., levels etc.) are described, even when specific relevant descriptions are not given, the numerical values or the associated information may be interpreted as including a margin of error that can be caused by several factors (e.g., factors in the process, internal or external impact, noise, etc.).

The wireless communication systems in the present disclosure refer to systems for providing various communication services using radio resources, such as a voice service, a data packet service, etc., and may include a terminal, a base station, a core network, and the like.

Embodiments described below may be applied to wireless communication systems using various radio access technologies. For example, embodiments of the present disclosure may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA) or the like. Further, the radio access technologies may denote not only a specific multiple access technology, but also a communication technology for each generation developed by various communication organizations such as 3GPP, 3GPP2, Wi-Fi, Bluetooth, IEEE, ITU, or the like. For example, the CDMA may be implemented with radio technologies, such as universal terrestrial radio access (UTRA), CDMA2000, or the like. The TDMA may be implemented with radio technologies, such as global system for mobile communications (GSM), general packet radio service (GPRS), enhanced data rates for GSM evolution (EDGE), or the like. The OFDMA may be implemented with radio technologies, such as institute of electrical and electronics engineers (IEEE) 802.11 (Wi-Fi), IEEE 802.16 (WiMAX), IEEE 802-20, evolved UTRA (E-UTRA), or the like. The IEEE 802.16m is the evolvement of IEEE 802.16e, and supports backward compatibility with a system based on the IEEE 802.16e. The UTRA is a part of the universal mobile telecommunications system (UMTS). 3rd generation partnership project (3GPP) long term evolution (LTE) is a part of E-UMTS (evolved UMTS) using evolved-UMTS terrestrial radio access (E-UTRA), and employs the OFDMA in downlink and the SC-FDMA in uplink. As described above, embodiments of the present disclosure may be applied to radio access technologies that are currently being launched or commercialized, or that are being developed or will be developed in the future.

Meanwhile, in the present disclosure, the term "terminal" is defined as a generic term meaning a device including a wireless communication module performing communications with a base station in a wireless communication system, and shall be construed as including, but not limited to, all of devices, such as, not only a user equipment (UE) supporting wideband code division multiple access (WCDMA), LTE, new radio (NR, referred to as next-generation/5G radio access technology), high speed packet access (HSPA), international mobile telecommunications (IMT)-2020 (5G or new radio), or the like, but a mobile station (MS) supporting the GSM, a user terminal (UT), a subscriber station (SS), a wireless device, or the like. Further, according to types of being used, the terminal may denote a user portable device such as a smart phone, or a vehicle, a device including a wireless communication module in the vehicle, or the like in a V2X communication system. Further, in the case of a machine type communication (MTC) system, the terminal may denote an MTC terminal, an M2M terminal, a ultra-reliable and low latency communications (URLLC) terminal, or the like, on which a communication module enabling machine type communication to be performed is mounted.

In the present disclosure, the term "base station" or "cell" generally refers to a station communicating with a terminal in a communication network. The base station or cell is defined as a generic term including, but not limited to, all of various coverage areas, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), a small cell, or the like. Further, the cell may denote including a bandwidth part (BWP) in the frequency domain. For example, a serving cell may denote an activation BWP of a terminal.

Each of these various cells is controlled by a base station controlling one or more cells. Therefore, the base station may be classified into two types. 1) One type of the base station may denote an apparatus providing a megacell, a macrocell, a microcell, a picocell, a femtocell, or a small cell that forms a communication service area, and 2) the other type of the base station may denote the communication service area. Apparatuses that form and provide a certain radio area, and that are controlled by one or more identical entities or that interact with one another for enabling two or more entities to cooperate with one another to provide the radio area may be referred to as the type 1) base station. A point, a transmission/reception point, a transmission point, a reception point, or the like may be an example of such base station according to methods of configuring radio areas. A radio area itself to which a terminal or a neighboring base station transmits a signal or from which the terminal or the neighboring base station receives a signal may be referred to as the type 2) base station.

In the present disclosure, the cell may denote a coverage of a signal transmitted from a transmission/reception point, a component carrier having a coverage of a signal transmitted from a transmission point or a transmission/reception point, or a transmission/reception point itself.

Uplink (UL) denotes a scheme of enabling a terminal to transmit data to, or receive data from, a base station, and downlink (DL) denotes a scheme of enabling the base station to transmit data to, or receive data from, the terminal. The downlink may denote communication or a communication path from multiple transmission/reception points to a terminal, and the uplink may denote communication or a communication path from the terminal to the multiple transmission/reception points. In the downlink, a transmitter may be a part of multiple transmission/reception points, and a receiver may be a part of a terminal. In the uplink, a transmitter may be a part of a terminal and a receiver may be a part of multiple transmission/reception points.

Control information can be transmitted and/or received through the uplink and/or the downlink configured with a control channel, such as a physical downlink control channel (PDCCH), a physical uplink control channel (PUCCH), and the like, and data can be transmitted through the uplink and/or the downlink configured with a data channel, such as a physical downlink shared channel (PDSCH), a physical uplink shared channel (PUSCH), and the like. Hereinafter, a situation where a signal is transmitted or received through a channel such as the PUCCH, the PUSCH, the PDCCH, or the PDSCH, may be expressed as the transmission or reception of the PUCCH, the PUSCH, the PDCCH, or the PDSCH.

Hereinafter, to describe clearly embodiments of the present disclosure, related description will be given based on, but is not limited to, the 3GPP long term evolution (LTE)/ long term evolution-A (LTE-A)/new radio (New RAT,"NR") communication system.

After 4th-generation (4G) communication technology has been developed, the development of 5th-generation (5G) communication technology organized by the 3GPP is in progress in order to meet requirements for next generation radio access technology under the ITU-R. Specifically, according to work organized by the 3GPP, a new NR communication technology as 5G communication technology has been developed independently of LTE-A pro that is evolved from LTE-Advanced technology to meet requirements of the ITU-R and 4G communication technology. Even though 5G communication technology herein includes the LTE-A pro and the NR, for convenience of description, unless explicitly stated otherwise, embodiments in the present disclosure will be discussed by focusing on the NR as the 5G communication technology.

Various operation scenarios of the NR are defined by adding scenarios for a satellite, a vehicle, a new vertical, and the like, in typical 4G LTE scenarios. In service aspects of the scenarios, the NR supports an enhanced mobile broadband (eMBB) scenario, a massive machine communication (mMTC) scenario that is characterized by a high density of terminals and a wide range of deployment and provides a low data rate and asynchronous access, and an ultra-reliability and Low latency (URLLC) scenario that is characterized by high responsiveness and reliability and provides high rate mobility.

To satisfy such scenarios, the NR specifies wireless communication systems to which at least one of a new waveform and frame structure technology, a low latency technology, a ultra-high frequency band (mmWave) support technology and a forward compatible providing technique is applied. In particular, in order to provide forward compatibility, in a flexibility aspect, various technological changes have been introduced into the NR system. Main technical features of the NR are described below with reference to the accompanying drawings.

<General NR System>

FIG. 1 is a diagram schematically illustrating a structure of a NR system where embodiments of the present disclosure may be applied.

Referring to FIG. 1, the NR system is divided into a 5G core network (5GC) and an NR-RAN part. The NG-RAN includes a gNB providing user plane (SDAP/PDCP/RLC/MAC/PHY) and control plane (RRC) protocol terminations toward a terminal, i.e. a user equipment and an ng-eNB providing E-UTRA user plane and control plane protocol terminations towards the terminal. Interconnection between gNBs or between the gNB and the ng-eNB is performed via a Xn interface. Each of the gNB and the ng-eNB is connected to the 5GC via an NG interface. The 5GC may include an access and mobility management function (AMF) in charge of a control plane of a terminal access and mobility control function, and the like, and a user plane function (UPF) in charge of a control function for user data. The NR supports both a frequency range of 6 GHz or less (FR1, Frequency Range 1) and a frequency range of 6 GHz or more (FR2, Frequency Range 2).

The gNB denotes a base station providing NR user plane and control plane protocol terminations toward a terminal, and the ng-eNB denotes a base station providing E-UTRA user plane and control plane protocol terminations toward a terminal. Base stations described herein should be interpreted as including both the gNB and the ng-eNB, and may be also used as either the gNB or the ng-eNB, when needed.

<NR Waveform, Numerology and Frame Structure>

In the NR, CP-OFDM waveform using cyclic prefix is used for DL transmission, and CP-OFDM or DFT-s-OFDM is used for UL transmission. The OFDM technology has advantages that can be easily combined with multiple input multiple output (MIMO), and that can use a receiver with high frequency efficiency and low complexity.

Meanwhile, the NR specifies different requirements for data rate, latency, coverage, etc. for each of the three scenarios described above; therefore, it is necessary to efficiently satisfy the requirements for each scenario through a frequency band configured for an NR system. To do this, a technology has been proposed for efficiently multiplexing a plurality of numerology-based radio resources different from one another.

Specifically, NR transmission numerology is determined based on subcarrier spacing and cyclic prefix (CP), and a μ value is used as an exponential value of 2 based on 15 kHz and exponentially changed, as shown in Table 1 below.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

TABLE 1-continued

Figure 2:
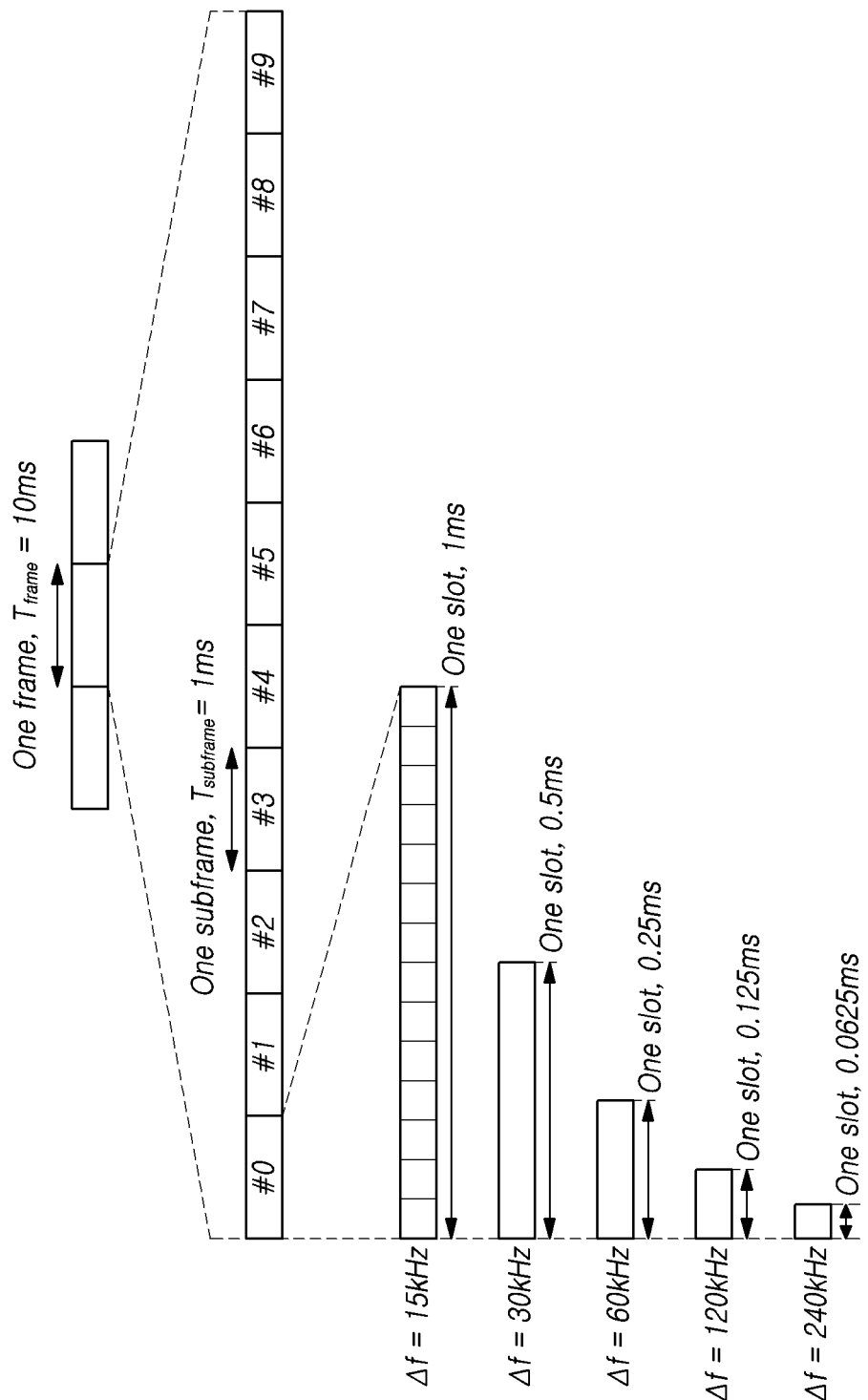
FIG. 2 is a diagram illustrating a frame structure of the NR system according to embodiments of the present disclosure.

As shown in Table 1 above, the NR numerology can be classified into five types according to the subcarrier spacing. This is different from the LTE, one of the 4G communication technologies, where subcarrier spacing is fixed at 15 kHz. Specifically, in the NR, subcarrier spacings used for data transmission are 15, 30, 60, and 120 kHz, and subcarrier spacings used for synchronous signal transmission are 15, 30, 120, and 240 kHz. Also, an extended CP is applied to only the 60 kHz subcarrier spacing. Meanwhile, a frame with a length of 10 ms including 10 subframes each having a length of 1 ms identical to one another is defined in the frame structure of the NR. One frame can be divided into half frames of 5 ms, and each half frame includes 5 subframes. In the case of the 15 kHz subcarrier spacing, one subframe is made up of one slot and each slot is made up of 14 OFDM symbols. FIG. 2 is a diagram illustrating the frame structure of the NR system according to embodiments of the present disclosure. Referring to FIG. 2, a slot is fixedly made up of 14 OFDM symbols in the case of normal CP, but a length of the slot in the time domain may be different depending on subcarrier spacings. For example, in the case of a numerology with the 15 kHz subcarrier spacing, one slot has a length of 1 ms identical to the subframe. In the case of numerology with the 30 kHz subcarrier spacing, while one slot is made up of 14 OFDM symbols, the slot has a length of 0.5 ms, and two slots can be included in one subframe. That is, as the subframe and the frame are defined to have a fixed time length, and the slot is defined by the number of symbols, a time length of the slot may be different according to subcarrier spacings.

Meanwhile, NR defines a slot as a basic unit of scheduling and also introduces a minislot (or a subslot or a non-slot based schedule) to reduce a transmission delay in the radio section. When a wide subcarrier spacing is used, since a length of one slot is inversely shortened, it is therefore possible to reduce a transmission delay in the radio section. The minislot (or subslot) is for efficient support for the URLLC scenario and can be scheduled based on 2, 4, or 7 symbols.

Further, unlike the LTE, the NR defines uplink and downlink resource allocations based on a symbol level within one slot. In order to reduce HARQ latency, a slot structure of allowing HARQ ACK/NACK to be directly transmitted in a transmission slot is defined, and this slot structure is referred to as a self-contained structure for description.

In the NR, the slot structure has been designed to enable a total of 256 slot formats to be supported, of which 62 slot formats are used in 3GPP Rel-15. Further, a common frame structure of allowing an FDD or TDD frame to be configured through various combinations of slots is supported in the NR. For example, the NR supports a slot structure in which all symbols of a slot are configured in downlink, a slot structure in which all symbols of a slot are configured in uplink, and a slot structure in which downlink symbols and uplink symbols are combined. Further, the NR supports that data transmission is scheduled such that data are distributed in one or more slots. Accordingly, a base station may inform a terminal whether a corresponding slot is a downlink slot, an uplink slot, or a flexible slot, using a slot format indicator (SFI). The base station may indicate the slot format i) by indicating an index of a table configured through UE-specific RRC signaling, using the SFI, ii) dynamically through downlink control information (DCI), or iii) statically or quasi-statically through RRC.

<NR Physical Resources>

An antenna port, a resource grid, a resource element, a resource block, a bandwidth part, or the like is considered with respect to physical resources in the NR.

The antenna port is defined such that a channel on which a symbol on an antenna port is carried can be inferred from a channel on which another symbol on the same antenna port is carried. If a large-scale property of a channel carrying a symbol on one antenna port can be inferred from a channel on which a symbol on another antenna port is carried, the two antenna ports may be in a quasi co-located or quasi co-location (QC/QCL) relationship. Here, the large-scale property includes at least one of a delay spread, a Doppler spread, a frequency shift, an average received power, and a received timing.

Figure 3:
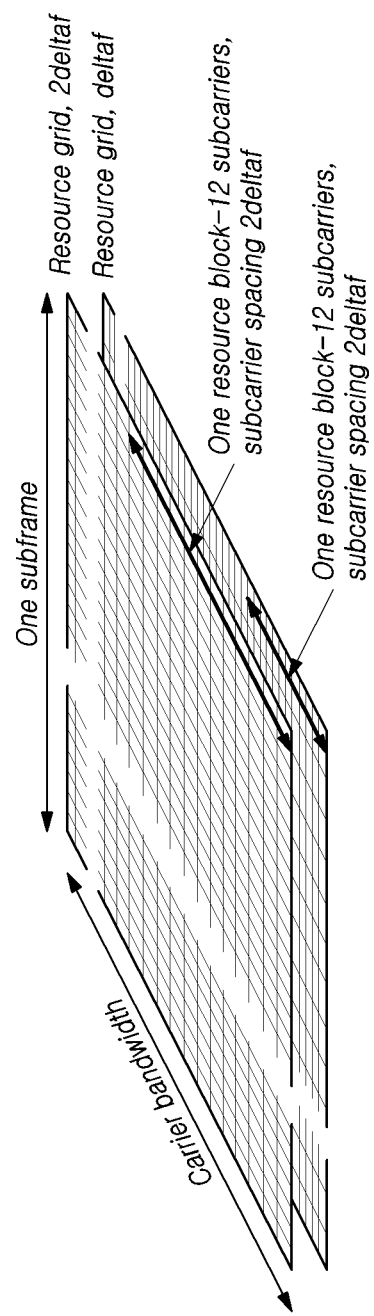
FIG. 3 is a diagram illustrating a resource grid supported by a radio access technology according to embodiments of the present disclosure.

FIG. 3 is a diagram illustrating a resource grid supported by the radio access technology according to embodiments of the present disclosure.

Referring to FIG. 3, since the NR supports a plurality of numerologies in an identical carrier, a resource grid can be configured according to each numerology. Further, the resource grid may be configured depending on an antenna port, a subcarrier spacing, and a transmission direction.

A resource block is made up of 12 subcarriers and is defined only in the frequency domain. Further, a resource element is made up of one OFDM symbol and one subcarrier. Therefore, as shown in FIG. 3, a size of one resource block may vary according to the subcarrier spacings. Further, the NR defines "Point A" that serves as a common reference point for resource block grids, a common resource block, and a virtual resource block.

Figure 4:
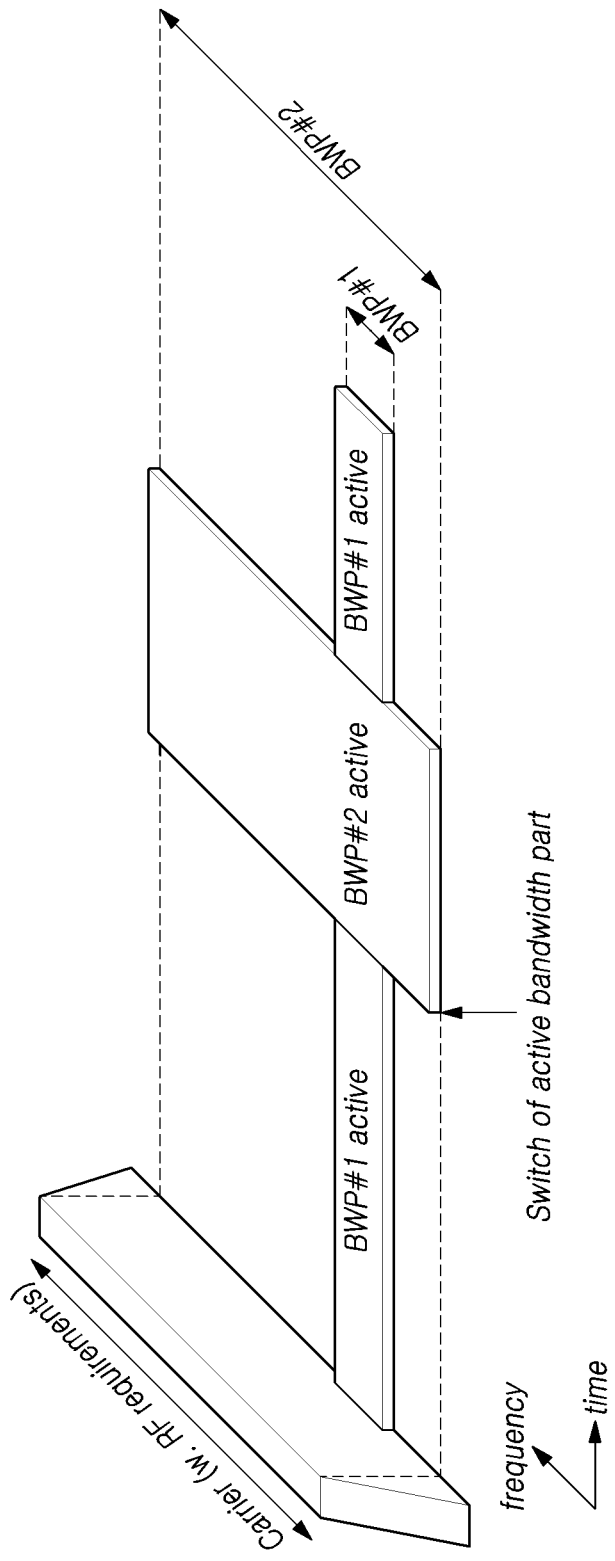
FIG. 4 is a diagram illustrating a bandwidth part supported by the radio access technology according to embodiments of the present disclosure.

FIG. 4 is a diagram illustrating a bandwidth part supported by the radio access technology according to embodiments of the present disclosure.

Unlike to the LTE in which a carrier bandwidth is fixed at 20 Mhz, in the NR, a maximum carrier bandwidth is configured from 50 Mhz to 400 Mhz for each subcarrier spacing. Therefore, it is not assumed that all terminals may use all of these carrier bandwidths. Thus, as shown in FIG. 4, in the NR, a terminal is allowed to designate and use a bandwidth part within a carrier bandwidth. Further, the bandwidth part may be associated with one numerology, be made up of consecutive subsets of the common resource block, and be activated dynamically over time. For a terminal, a maximum of four bandwidth parts are configured in each of uplink and downlink, and data can be transmitted or received using an activated bandwidth part at a given time.

In the case of a paired spectrum, the uplink and downlink bandwidth parts are configured independently. In the case of an unpaired spectrum, the downlink and uplink bandwidth parts are configured in pairs to enable a center frequency to be shared to prevent unnecessary frequency re-tuning between downlink and uplink operations.

<NR Initial Access>

In the NR, a terminal performs cell search and random access procedures to access a base station and perform communication.

The cell search is a procedure for enabling a terminal to synchronize with a cell of an associated base station using a synchronization signal block (SSB) transmitted by the base station, obtain a physical layer cell ID, and obtain system information.

Figure 5:
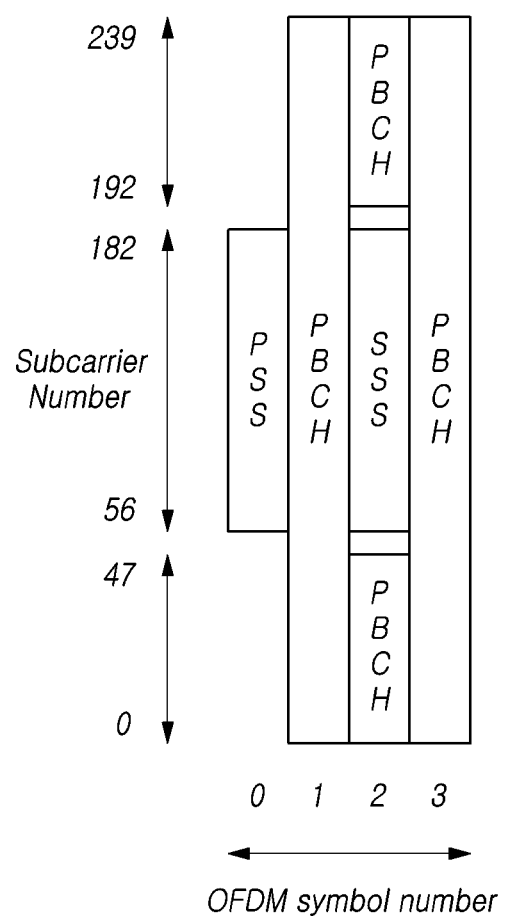
FIG. 5 is a diagram illustrating an example of a synchronization signal block in the radio access technology according to embodiments of the present disclosure.

FIG. 5 is a diagram illustrating an example of a synchronization signal block in the radio access technology according to embodiments of the present disclosure.

Referring to FIG. 5, the SSB includes a primary synchronization signal (PSS) and a secondary synchronization signal (SSS), each of which occupies one symbol and 127 subcarriers, and a PBCH configured on three OFDM symbols and 240 subcarriers.

A terminal monitors the SSB in time and frequency domains and receives the SSB.

The SSB may be transmitted up to 64 times for 5 ms. A plurality of SSBs are transmitted through different transmission beams within 5 ms duration, and the terminal detects the SSBs, assuming that the SSBs are transmitted every 20 ms period based on a specific one beam used for transmission. The higher the frequency band is, the greater the number of beams that can be used for SSB transmission within 5 ms duration can increase. For example, the SSBs can be transmitted using i) a maximum of four different beams in a frequency band of 3 GHz or lower, ii) a maximum of 8 different beams in a frequency band of 3 GHz to 6 GHz, and iii) a maximum of 64 different beams in a frequency band of 6 GHz or higher.

Two SSBs are included in one slot, and a start symbol and the number of repetitions in a slot are determined according to subcarrier spacings as described below.

Meanwhile, the SSB is not transmitted at a center frequency of a carrier bandwidth unlike the SSB of the LTE. That is, the SSB may be transmitted on a frequency that is not the center of a system band, and a plurality of SSBs may be transmitted in the frequency domain in a situation where wideband operation is supported. According to this, the terminal monitors a SSB using a synchronization raster, which is a candidate frequency position for monitoring the SSB. A carrier raster and the synchronous raster, which are center frequency position information of a channel for initial access, are newly defined in the NR. Since the synchronous raster is configured with a wide frequency interval compared with the carrier raster, thus, the synchronous raster can support rapid SSB search of the terminal.

The terminal may acquire a master information block (MIB) through a PBCH of the SSB. The MIB includes minimum information for enabling the terminal to receive remaining minimum system information (RMSI) broadcast by an associated network. Further, the PBCH may include information on a position of a first DM-RS symbol in the time domain, information for allowing the terminal to monitor system information block 1 (SIB1) (for example, SIB1 numerology information, SIB1 CORESET related information, search space information, physical downlink control channel (PDCCH) related parameter information, etc.), offset information between a common resource block and a SSB (an absolute position of the SSB in a carrier is transmitted via the SIB1), and the like. Here, the SIB1 numerology information is equally applied to one or more messages used in a random access procedure for accessing a base station after the terminal has completed the cell search procedure. For example, numerology information of the SIB1 may be applied to one of messages 1 to 4 for the random access procedure.

The RMSI may denote system information block 1 (SIB1), and the SIB1 is broadcast periodically (ex, 160 ms) in a corresponding cell. The SIB1 includes information needed for the UE to perform an initial random access procedure, and is periodically transmitted through a PDSCH. In order to receive the SIB1, the terminal is required to receive numerology information used for SIB1 transmission and control resource set (CORESET) information used for SIB1 scheduling, through the PBCH. The terminal identifies the scheduling information for the SIB1 using a SI-RNTI in the CORESET, and acquires the SIB1 on the PDSCH according to the scheduling information. Remaining SIBs except for the SIB1 may be transmitted periodically or may be transmitted according to a request of a UE.

Figure 6:
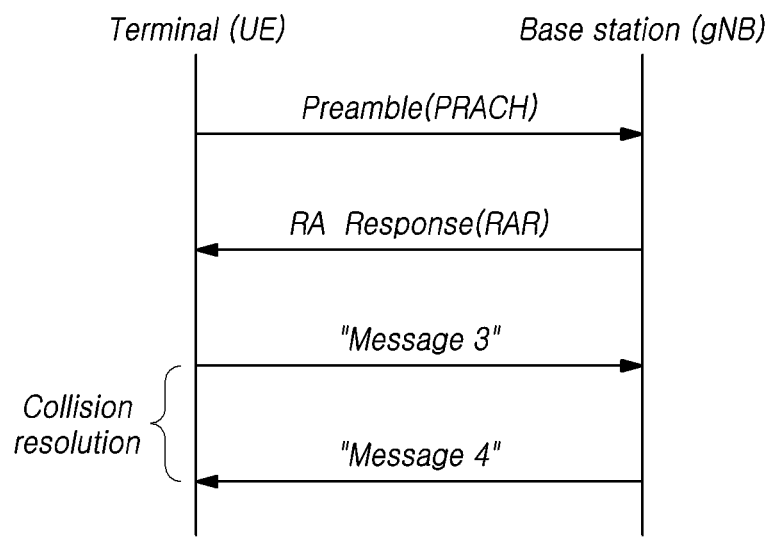
FIG. 6 is a diagram illustrating a random access procedure in the radio access technology according to embodiments of the present disclosure.

FIG. 6 is a diagram illustrating a random access procedure available in the radio access technology according to embodiments of the present disclosure.

Referring to FIG. 6, when cell search is completed, a terminal transmits a random access preamble for random access to a base station. The random access preamble is transmitted through a PRACH. Specifically, the random access preamble is transmitted to the base station through the PRACH, which is made up of consecutive radio resources in a specific slot repeated periodically. Generally, a contention-based random access procedure is performed when a terminal initially accesses a cell, and a non-contention based random access procedure is performed when random access is performed for beam failure recovery (BFR).

The terminal receives a random access response to the transmitted random access preamble. The random access response may include a random access preamble identifier (ID), an uplink grant (uplink radio resource), a temporary cell-radio network temporary identifier (temporary C-RNTI), and a time alignment command (TAC). Since one random access response may include random access response information for one or more terminals, the random access preamble identifier may be included to inform which terminal the included uplink grant, the temporary C-RNTI and the TAC are valid to. The random access preamble identifier may be an identifier of a random access preamble received by the base station. The TAC may be included as information for enabling the terminal to adjust uplink synchronization. The random access response may be indicated by a random access identifier on a PDCCH, i.e., a random access-radio network temporary identifier (RA-RNTI).

When receiving the valid random access response, the terminal processes information included in the random access response and performs scheduled transmission to the base station. For example, the terminal applies the TAC and stores the temporary C-RNTI. Further, using the UL grant, the terminal transmits data stored in a buffer or newly generated data to the base station. In this case, information for identifying the terminal should be included.

The terminal receives a downlink message for contention resolution.

<NR Coreset>

A downlink control channel in the NR is transmitted on a control resource set (CORESET) having a length of 1 to 3 symbols, and transmits up/down scheduling information, slot format index (SFI) information, transmit power control (TPC) information, and the like.

Thus, in the NR, in order to secure the flexibility of the system, a concept of the CORESET is introduced. The control resource set (CORESET) denotes a time-frequency resource for a downlink control signal. The terminal may decode a control channel candidate using one or more search spaces in a CORESET time-frequency resource. Quasi CoLocation (QCL) assumption is established for each CORESET, which is used for the purpose of informing characteristics for analogue beam directions in addition to characteristics assumed by typical QCL, such as delayed spread, Doppler spread, Doppler shift, or average delay.

Figure 7:
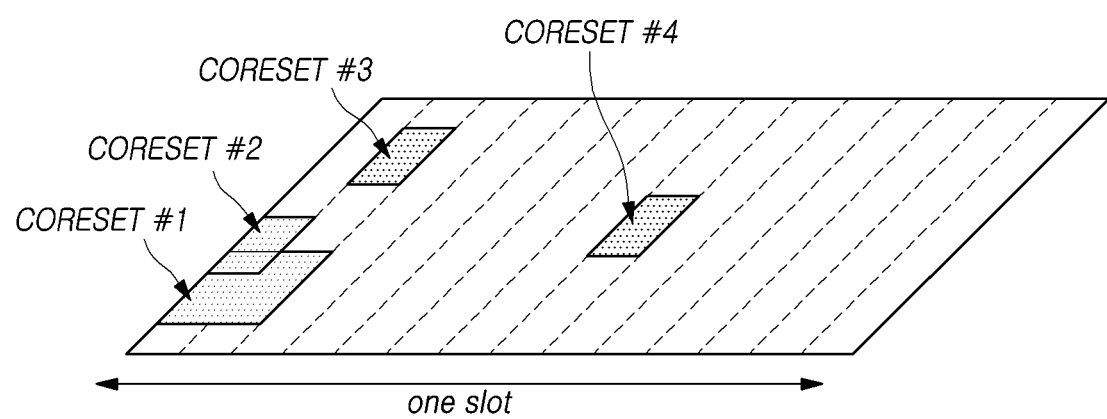
FIG. 7 is a diagram illustrating CORESETs.

FIG. 7 is a diagram illustrating a CORESET.

Referring to FIG. 7, the CORESET may be configured in various forms within a carrier bandwidth in one slot, and may be made up of a maximum of 3 OFDM symbols in the time domain. In addition, the CORESET is defined as a multiple of six resource blocks up to a carrier bandwidth in the frequency domain.

A first CORESET is indicated through the MIB as a part of an initial bandwidth part configuration to enable additional configuration information and system information to be received from the network. After establishing a connection with a base station, a terminal may receive information on one or more CORESETs through RRC signaling.

In the present disclosure, a frequency, a frame, a sub-frame, a resource, a resource block (RB), a region, a band, a sub-band, a control channel, a data channel, a synchronization signal, various reference signals, various signals, or various messages associated with the NR may be interpreted as terms or meanings that were used in the past or are used in the present or as various terms or meanings that will be used in the future.

The terminal may receive a channel state information (CSI) reference signal (CSI-RS), and then measure quality for a communication channel with the base station. The CSI-RS is a signal transmitted by the base station for estimating a channel state. In the present disclosure, the estimating of a channel state is discussed based on the CSI-RS; however, embodiments of the present disclosure are not limited thereto. For example, a channel state may be equally estimated based on a synchronization signal block (SSB). Further, hereinafter, a method of measuring a channel is discussed based on reference signal reception power (RSRP); however, embodiments of the present disclosure are not limited thereto. For example, a channel may be equally measured based on RSRQ, or the like.

When the terminal measures the CSI-RS, the terminal includes information on measurement results in channel state information and transmits the channel state information to the base station. The information on the measurement results may include various information, such as, but not limited to PMI, RI, and the like. The channel state information may be transmitted periodically or non-periodically, and transmitted through an uplink control channel or an uplink data channel.

Meanwhile, beamforming technology has been introduced in the NR (New-RAT) to which 5G communication technology is applied. This enables various services to be provided for each terminal by establishing beam paring with a corresponding terminal using an analogue beamforming technique. To do this, a base station transmits multiple beams using beam sweeping, and performs a beam paring procedure with a terminal.

When the base station transmits multiple beams using the beam sweeping, it may be needed to obtain channel state information for each beam. The terminal may measure channel states for multiple beams indicated by the base station, and report these to the base station. A CSI-RS or an SSB in each beam may be used for measuring a channel state, and the base station may indicate, to the terminal, resource information for a signal to be measured and a target to be measured.

In this case, when the terminal transmits channel measurement results for each beam to the base station, transmitting all of the measurement results of respective beams may cause an associated system to become overloaded. Accordingly, in reporting channel measurement results for multiple beams to the base station, a new method is desired to minimize an overload of the system.

Figure 8:
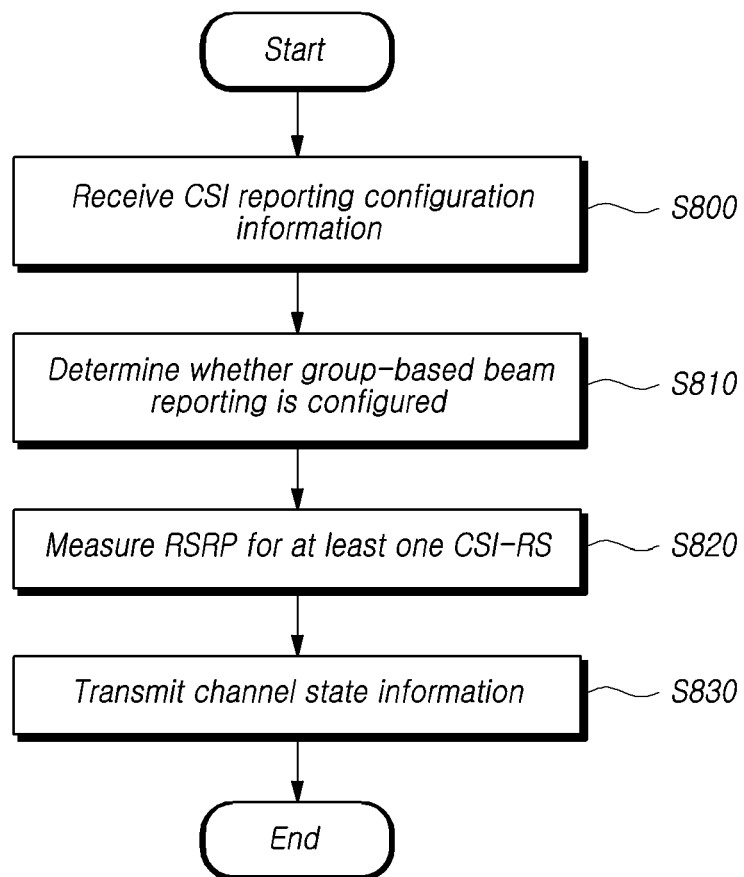
FIG. 8 is a flow diagram illustrating operation of a terminal according to embodiments of the present disclosure.

FIG. 8 is a flow diagram illustrating operation of a terminal according to embodiments of the present disclosure.

Referring to FIG. 8, a method of enabling the terminal to transmit channel state information for one or more beams may receive CSI report configuration information from a base station, at step S800.

For example, the terminal may receive the CSI report configuration information through an RRC message from the base station. The CSI report configuration information may include resource information on one or more targets required to be measured by the terminal. Further, the CSI report configuration information may include information on a measurement method required to be used by the terminal. Further, the CSI report configuration information may include parameters for indicating a channel state information transmission period or a trigger condition of the terminal, non-periodic transmission, or the like.

FIG. 9 is a diagram illustrating an information element of CSI reporting configuration information according to embodiments of the present disclosure.

Referring to FIG. 9, the CSI reporting configuration information may include group-based beam reporting parameters indicating whether group-based beam reporting is configured. For example, a groupBasedBeamReporting parameter may include a value indicating enablement or disablement.

In another example, when a value of the groupBasedBeamReporting parameter is set to enablement, it may be determined that group-based beam reporting is configured. In another example, when a value of the groupBasedBeamReporting parameter is not designated, a corresponding terminal may recognize this as enablement.

In another example, when a value of the groupBasedBeamReporting parameter is set to disablement, it may be determined that group-based beam reporting is not configured. When a value of the groupBasedBeamReporting parameter is set to disablement, a value indicating the number of measured CSI-RS resources to be included channel state information may be included. When the value of the groupBasedBeamReporting parameter indicates the disablement, any one of four different values of indicating the number of measured CSI-RS resources to be included in channel state information may be set. In this case, the four different values may be set as 1, 2, 4, 8, and the like; however, embodiments of the present disclosure are not limited thereto.

For example, if the value of 2 is set in the groupBasedBeamReporting parameter, a corresponding terminal may recognize that group-based beam reporting is disabled, and the terminal is required to transmit 2 CSI-RS measurement results. That is, a situation where the terminal is required to transmit 1 CSI-RS measurement result corresponds to a case where the value of 1 is set in the groupBasedBeamReporting parameter.

The method of transmitting channel state information may determine whether group-based beam reporting is used based on the received CSI reporting configuration information, at step S810.

For example, when the group-based beam reporting parameter is set to enablement, or a value indicating the number of measured CSI-RS resources to be included in channel state information is set as a value exceeding 1, the terminal may determine that the group-based beam reporting is used. This means that a plurality of CSI-RS RSRP measurement results is included in channel state information transmitted by the terminal.

In another example, when the group-based beam reporting parameter is set to disablement, and a value indicating the number of measured CSI-RS resources to be included in channel state information is set as 1, the terminal may determine that the group-based beam reporting is not used. This may mean that only 1 CSI-RS RSRP measurement result is included in channel state information transmitted by the terminal.

Through this, the terminal may determine the number of CSI-RS RSRP measurement results to be included in channel state information.

The method of transmitting channel state information may measure RSRP for one or more CSI-RSs received through one or more CSI-RS resources, at step S820. The terminal may measure RSRP based on one or more CSI-RSs transmitted by the base station. The RSRP may be measured for each beam identifier. The order in which the step S810 and the step S820 are performed may be changed. That is, the step S820 is performed prior to the step S810.

Meanwhile, the method of transmitting channel state information may transmit channel state information including a value in a table configured in advance based on whether the group-based beam reporting is used and the one or more CSI-RS RSRP measurement results, at step S830.

For example, the table configured in advance may include a table for indicating one CSI-RS RSRP measurement result and a table for indicating at least one differential CSI-RS RSRP measurement result. That is, the terminal may configure one or more tables in advance for indicating a plurality of CSI-RS RSRP measurement results. The table configured in advance may be received through an RRC message from the base station, or be configured and stored in advance in the terminal.

The terminal may configure the channel state information according to whether the group-based beam reporting is used. To do this, the terminal may determine any one of one or more tables configured in advance that will be used to select an index value.

Hereinafter, examples of tables configured in advance are described with reference to the accompanying drawings.

FIGS. 10 to 13 are diagrams illustrating examples of RSRP tables configured in advance according to embodiments of the present disclosure.

Referring to FIG. 10, a table for indicating one CSI-RS RSRP measurement result may be configured in 7 bits, and values in the range of [−140, −44] dBm may be divided and configured at 1 dB intervals.

Referring to FIG. 11, a table for indicating one CSI-RS RSRP measurement result may be configured in 6 bits, and values in the range of [−140, −44] dBm may be divided and configured at 2 dB intervals.

Referring to FIG. 12, a table for indicating one CSI-RS RSRP measurement result may be configured in 7 bits, and values in the range of [−140, −44] dBm may be divided and configured at 1 dB intervals or 0.5 dB intervals. For example, the values in the range of [−140, −44] dBm may be configured at 1 dB intervals in one specific section and at 0.5 dB intervals in the other section. In addition, such table may be configured at various dB intervals, and embodiments of the present disclosure are not limited thereto.

Referring to FIG. 13, a table for indicating one CSI-RS RSRP measurement result may be configured in 7 bits, and values in the range of [−140, −44] dBm may be divided and configured at 1 dB intervals. In this case, in order for CSI-RSRP to be indicated together with the L3 SS-RSRP table, the CSI-RSRP can be configured to be identified by being mapped to the middle part of values of 7 bits. That is, RSRP 16 to RSRP 113 may be configured to be used as identifiers for indicating the CSI-RS RSRP.

The above-described tables are examples for describing embodiments of the present disclosure, and an interval, a range, or the like may be variously configured.

Referring back to FIG. 8, when it is determined that the group-based beam reporting is not used, the terminal may include, in channel state information, a value of 7 bits corresponding to a section in which one CSI-RS RSRP measurement result is included from a table configured in advance (e.g., FIG. 10 or FIG. 13) in which values in the range of [−140, −44] dBm are broken down and set at 1 dB intervals, and then transmit the channel state information including the value of 7 bits.

Meanwhile, when it is determined that the group-based beam reporting is used, including values of 7 bits for each measurement result in channel state information may lead an amount of data in the channel state information to be overloaded.

FIGS. 14 and 15 are diagrams illustrating group-based beam reporting operation for multiple beams according to embodiments of the present disclosure.

Referring to FIG. 14, when the number of L beam groups including Q beam IDs is present, if a terminal measures RSRP for each beam ID, the terminal is required to include, in channel state information, each of a maximum of (L X Q) RSRP values in 7 bits, and transmit the channel state information.

To address such issue, the channel state information may be transmitted using a value in a differential CSI-RS RSRP table for each beam group.

Referring to FIG. 15, a terminal may determine a reference RSRP value based on an RSRP value for one beam ID for each beam group, and then indicate an RSRP value for another beam ID included identical beam group as a difference from the reference RSRP value. Through this, it is possible to reduce the overload of an amount of data caused by transmitting channel state information including RSRP values for all beam IDs in 7 bits.

For example, when it is determined that the group-based beam reporting is used, the terminal may include, in channel state information, a value of 7 bits corresponding to a section in which a CSI-RS RSRP measurement result having a largest value of a plurality of CSI-RS RSRP measurement results is included, from a table configured in advance in which values in the range of [−140, −44] dBm are broken down and set at 1 dB intervals. Further, the terminal may include, in channel state information, remaining CSI-RS RSRP measurement results except for the CSI-RS RSRP measurement result having the largest value of the plurality of CSI-RS RSRP measurement results using a table for indicating a differential CSI-RS RSRP measurement result. Here, the reference RSRP value is determined as the largest value, and in another example, the reference RSRP value may be determined as a smallest value.

The table for indicating the differential CSI-RS RSRP measurement result is made up of 16 sections broken down at 2 bB intervals indicating a difference from the CSI-RS RSRP measurement result having the largest value of the plurality of CSI-RS RSRP measurement results. Accordingly, the remaining CSI-RS RSRP measurement results may be included in the channel state information as values in 4 bits. The table for indicating the differential CSI-RS RSRP measurement result is described as being configured in 4 bits; however, any values smaller than 7 bits may be available.

FIGS. 16 and 17 are diagrams illustrating examples of differential RSRP tables according to embodiments of the present disclosure.

Referring to FIG. 16, the differential RSRP table may be configured in 4 bits. That is, an RSRP table 1600 of 4 bits may be configured at 1 dB intervals. In another example, an RSRP table 1610 of 5 bits may be configured at 1 dB intervals.

In addition, differential RSRP tables may be configured at 2 dB intervals, or the like, and be variously configured in 3 bits, 4 bits, 5 bits, 6 bits, or the like. In another example, an interval of a section for each bit may be differentially configured. For example, in respective cases of 3 bits, 4 bits, and 5 bits, corresponding differential RSRP tables may be configured at 3 dB intervals, 2 dB intervals, and 1 dB intervals, respectively.

Referring to FIG. 17, a differential RSRP table is configured in 4 bits, configured at 2 dB intervals, and thus, configured with 16 sections.

As described above, when it is determined that the group-based beam reporting is used, the channel state information may include one value of 7 bits indicating a largest value of a plurality of CSI-RS RSRP measurement results and one or more values of 4 bits indicating a difference from the largest value. Further, the application of the differential RSRP measurement result may be performed only in a corresponding identical beam group.

Through this, the terminal can reduce the overload of an amount of data included in channel state information that may occur when indicating each of RSRP values in 7 bits.

Hereinafter, operation of a base station capable of performing the embodiments of the present disclosure described above is briefly discussed with reference to the accompanying drawings.

Figure 18:
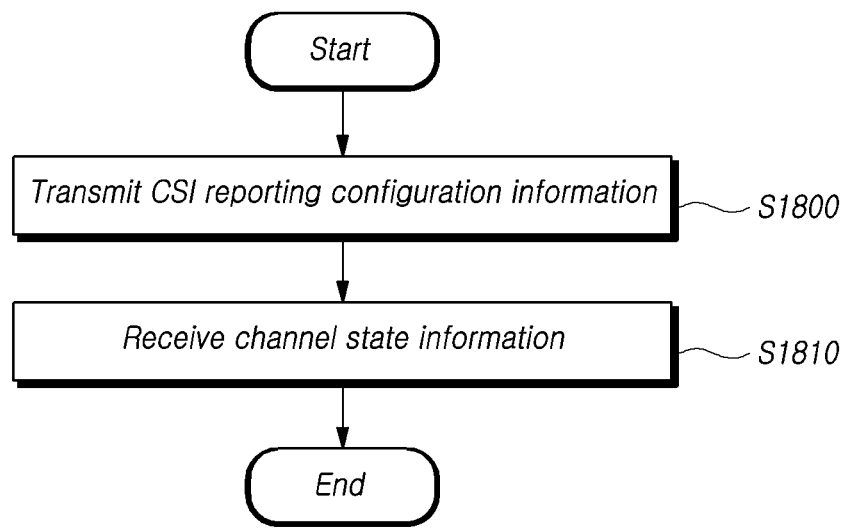
FIG. 18 is a flow diagram illustrating operation of a base station according to embodiments of the present disclosure.

FIG. 18 is a flow diagram illustrating operation of a base station according to embodiments of the present disclosure.

Referring to FIG. 18, a method of enabling a base station to receive channel state information for one or more beams may include transmitting CSI report configuration information to a terminal, at step S1800.

As described above, the CSI reporting configuration information may include group-based beam reporting parameters indicating whether group-based beam reporting is configured. For example, when the group-based beam reporting parameter is set to disablement, the group-based beam reporting parameters may further include a value indicating the number of measured CSI-RS resources to be included in channel state information. In addition, the CSI reporting configuration information may include various parameters described with reference to FIG. 9.

The method of receiving the channel state information may include receiving channel state information including two or more CSI-RS RSRP measurement results when group-based beam reporting is determined based on the CSI reporting configuration information, at step S1810.

In this case, the CSI-RS RSRP measurement results may be included in the channel state information as values in a table configured in advance in the terminal. For example, the table configured in advance may include a table for indicating one CSI-RS RSRP measurement result and a table for indicating at least one differential CSI-RS RSRP measurement result.

For example, the channel state information may include a value of 7 bits corresponding to a section in which a CSI-RS RSRP measurement result having a largest value of two or more CSI-RS RSRP measurement results is included, from a table configured in advance for indicating one CSI-RS RSRP measurement result in which values in the range of [−140, −44] dBm are broken down and set at 1 dB intervals. Further, the channel state information may include values of 4 bits selected from the table for indicating the differential CSI-RS RSRP measurement result for remaining CSI-RS RSRP measurement results except for the CSI-RS RSRP measurement result having the largest value of the two or more CSI-RS RSRP measurement results.

The table for indicating the differential CSI-RS RSRP measurement result may be made up of 16 sections divided at 2 bB intervals indicating a difference from the CSI-RS RSRP measurement result having the largest value of the plurality of CSI-RS RSRP measurement results.

In addition, the base station may perform all operations for controlling the methods of a terminal for transmitting channel state information described with reference to FIGS. 8 to 17.

In accordance with the foregoing discussions, when transmitting group beam based channel state information through operations of a terminal and a base station, it is possible to provide an effect of preventing an amount of data from being excessively increased.

Hereinafter, a power headroom reporting method of a terminal to which a scheme similar to those of the above embodiments is applied is discussed.

<Power Headroom Reporting>

Power headroom reporting procedure is used for providing a base station with information on a difference between maximum terminal transmission power and estimated power for UL-SCH transmission or SRS transmission for each activated serving cell. Further, it is used for providing information on maximum terminal power and estimated power for UL-SCH and PUCCH transmissions in a SpCell and a PUCCH SCell.

Information on a period, a delay and mapping for the power headroom reporting may be indicated by a base station, and the RRC layer controls the power headroom reporting based on two timers. Here, the two timers are dl-PathlossChange and prohibitPHR-Timer.

The power headroom reporting is triggered by at least one of the following cases.
- The prohibitPHR-Timer expires, or the prohibitPHR-Timer expires and dl-PathlossChange parameter error path loss information is changed.
- The dl-PathlossChange expires.
- Power headroom reporting function is configured or reconfigured from a higher layer.
- A SCell is activated, or added.
- An uplink resource is assigned, etc.

Figure 19:
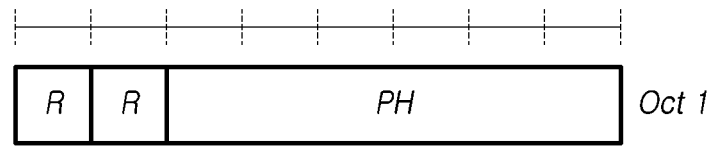
FIGS. 19 and 20 are diagrams illustrating a MAC CE for power headroom reporting according to embodiments of the present disclosure.
Figure 20:
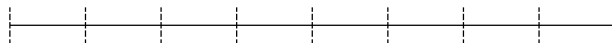

FIGS. 19 and 20 are diagrams illustrating a MAC control element (CE) for power headroom reporting according to embodiments of the present disclosure.

Referring to FIG. 19, in the power headroom reporting, the MAC control element may be identified by a MAC PDU subheader in which a logical channel identifier (LCID) is present.

Here, R represents a reserved bit, and is set as 0. PH represents a power headroom field and includes a value of a power headroom level. The PH is configured in 6 bits, and the power headroom level is determined as a value mapped in a table configured in advance.

For example, the table for the power headroom level may be configured as in Table 2 below.

TABLE 2

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Meanwhile, a power headroom reporting range may be set as a range of −23 to +40 dB, and be mapped with a power headroom level in Table 3 below.

TABLE 3

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

Referring to FIG. 20, a single entry power headroom MAC CE may be identified by a MAC PDU subheader together with an LCID.

Here, R represents a reserved bit, and is set as 0. PH represents a field for indicating a power headroom level, and is configured in 6 bits. Pcmax,c represents a value of maximum terminal transmission power used in a previous PH field calculation, and may be configured in 6 bits.

Table 4 below may be used for a value included in the PH field PH, and Table 5 below may be used for the Pcmax,c.

TABLE 4

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 5

| $P_{CMAXc}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

In the present disclosure, a method is provided for breaking down power headroom steps used when reporting power headroom information to a base station. As described above, in the 4G LTE, to report the power headroom information, a power headroom is broken down into 64 steps of 0 to 63 corresponding to from −23 dB to 40 dB at 1 dB intervals in 6 bits. In the LTE, one base station covers a radius of several hundreds of meters to several kilometers. In contrast, in the 5G, there is a possibility that each base station may cover only a radius of several tens of meters to several hundreds of meters using a small cell. Thus, a change in numerical values related to power headroom reporting is needed due to a reduced cell size, compared with the LTE. According to this, a power headroom reporting method is provided in which after breaking down power headroom (PH) steps into 32 steps in 5 bits, 48 steps in 6 bits, 64 steps in 6 bits, 128 steps in 7 bits, or the like, a measurement power value corresponding to each step is assigned to any range or numeric value.

Embodiment 1

Power headroom information may be included in a MAC CE using Table 6 below in which a power headroom is configured with 5 bits and broken down into 32 sections.

For example, in the Table 6, power headroom steps are broken down into 32 steps in 5 bits. Measurement power values corresponding to a power headroom (PH) to be reported may be resulted from breaking down a range of −23~23 dB on a 1 dB or 2 dB basis at different intervals, and an actual measurement power value may be any range or numeric value different from this.

TABLE 6

| Reported Value 값 | Measured Quantity Valued(dB) | |
|---|---|---|
| POWER_HEADROOM_0 | −23 ≤ PH < −21 | 2 dB |
| POWER_HEADROOM_1 | −21 ≤ PH < −19 | 2 dB |
| POWER_HEADROOM_2 | −19 ≤ PH < −17 | 2 dB |
| POWER_HEADROOM_3 | −17 ≤ PH < −15 | 2 dB |
| POWER_HEADROOM_4 | −15 ≤ PH < −13 | 2 dB |
| POWER_HEADROOM_5 | −13 ≤ PH < −11 | 2 dB |
| POWER_HEADROOM_6 | −11 ≤ PH < −9 | 2 dB |
| POWER_HEADROOM_7 | −9 ≤ PH < −7 | 2 dB |
| POWER_HEADROOM_8 | −7 ≤ PH < −6 | 2 dB |
| ... | ... | |
| POWER_HEADROOM_22 | 7 ≤ PH < 8 | 1 dB |
| POWER_HEADROOM_23 | 8 ≤ PH < 9 | 1 dB |
| POWER_HEADROOM_24 | 9 ≤ PH < 11 | 2 dB |
| POWER_HEADROOM_25 | 11 ≤ PH < 13 | 2 dB |
| POWER_HEADROOM_26 | 13 ≤ PH < 15 | 2 dB |
| POWER_HEADROOM_27 | 15 ≤ PH < 17 | 2 dB |
| POWER_HEADROOM_28 | 17 ≤ PH < 19 | 2 dB |
| POWER_HEADROOM_29 | 19 ≤ PH < 21 | 2 dB |
| POWER_HEADROOM_30 | 21 ≤ PH < 23 | 2 dB |
| POWER_HEADROOM_31 | PH ≥ 23 | 2 dB |

That is, a power headroom level for power headroom reporting may be configured at a plurality of intervals rather than an identical interval.

Embodiment 2

In another embodiment, power headroom steps may be broken down into 64 steps in 6 bits. Measurement power values corresponding to a power headroom (PH) to be reported may be resulted from breaking down a range of −23~40 dB on a 2 dB or 0.5 dB basis at different intervals, and an actual measurement power value may be any range or numeric value different from this.

TABLE 7

| Reported Value 값 | Measured Quantity Valued(dB) | |
|---|---|---|
| POWER_HEADROOM_0 | −23 ≤ PH < −21 | 2 dB |
| POWER_HEADROOM_1 | −21 ≤ PH < −19 | 2 dB |
| POWER_HEADROOM_2 | −19 ≤ PH < −17 | 2 dB |
| ... | ... | |
| POWER_HEADROOM_9 | −5 ≤ PH < −3 | 2 dB |
| POWER_HEADROOM_10 | −3 ≤ PH < −1 | 2 dB |
| POWER_HEADROOM_11 | −1 ≤ PH < −0.5 | 0.5 dB |
| POWER_HEADROOM_12 | −0.5 ≤ PH < 0 | 0.5 dB |
| POWER_HEADROOM_13 | 0 ≤ PH < 0.5 | 0.5 dB |
| POWER_HEADROOM_14 | 0.5 ≤ PH < 1 | 0.5 dB |
| ... | ... | |
| POWER_HEADROOM_50 | 18.5 ≤ PH < 19 | 0.5 dB |
| POWER_HEADROOM_51 | 19 ≤ PH < 19.5 | 0.5 dB |
| POWER_HEADROOM_52 | 19.5 ≤ PH < 20 | 0.5 dB |
| POWER_HEADROOM_53 | 20 ≤ PH < 22 | 2 dB |
| POWER_HEADROOM_54 | 22 ≤ PH < 24 | 2 dB |
| ... | ... | |
| POWER_HEADROOM_60 | 34 ≤ PH < 36 | 2 dB |
| POWER_HEADROOM_61 | 36 ≤ PH < 38 | 2 dB |
| POWER_HEADROOM_62 | 38 ≤ PH < 40 | 2 dB |
| POWER_HEADROOM_63 | PH ≥ 40 | 2 dB |

That is, an interval between PH values included in a power headroom level may be configured with a plurality of intervals, and one or more intervals between PH values around a center value may be configured at a narrower interval.

Embodiment 3

In another embodiment, power headroom steps may be broken down into 64 steps in 6 bits. Measurement power values corresponding to a power headroom (PH) to be reported may be resulted from breaking down a range of −10~21 dB on a 0.5 dB basis at a uniform interval, and an actual measurement power value may be any range or numeric value different from this.

TABLE 8

| Reported Value | Measured Quantity Valued(dB) |
|---|---|
| POWER_HEADROOM_0 | −10 ≤ PH < −9.5 |
| POWER_HEADROOM_1 | −9.5 ≤ PH < −9 |
| POWER_HEADROOM_2 | −9 ≤ PH < −8.5 |
| POWER_HEADROOM_3 | −8.5 ≤ PH ≤ −8 |
| ... | ... |
| POWER_HEADROOM_61 | 20 ≤ PH < 20.5 |
| POWER_HEADROOM_62 | 20.5 ≤ PH < 21 |
| POWER_HEADROOM_63 | PH ≥ 21 |

Here, an interval is configured to maintain a uniform interval of 0.5 dB.

Embodiment 4

In another embodiment, power headroom steps may be broken down into 48 steps in 6 bits. Measurement power values corresponding to a power headroom (PH) to be reported may be resulted from breaking down a range of −17-90 dB on a 1 dB basis at a uniform interval, and an actual measurement power value may be any range or numeric value different from this.

TABLE 9

| Reported Value | Measured Quantity Valued(dB) |
|---|---|
| POWER_HEADROOM_0 | $-17 \leq PH < -16$ |
| POWER_HEADROOM_1 | $-16 \leq PH < -15$ |
| POWER_HEADROOM_2 | $-15 \leq PH < -14$ |
| ... | ... |
| POWER_HEADROOM_46 | $28 \leq PH < 29$ |
| POWER_HEADROOM_47 | $PH \geq 30$ |
| POWER_HEADROOM_48 | Reserved |
| ... | ... |
| POWER_HEADROOM_62 | Reserved |
| POWER_HEADROOM_63 | Reserved |

Embodiment 5

In another embodiment, power headroom steps may be broken down into 128 steps in 7 bits. Measurement power values corresponding to a power headroom (PH) to be reported may be resulted from breaking down a range of −23~40 dB on a 0.5 dB basis at a uniform interval, and an actual measurement power value may be any range or numeric value different from this.

TABLE 10

| Reported Value | Measured Quantity Valued(dB) |
|---|---|
| POWER_HEADROOM_0 | $-23 \leq PH < -22.5$ |
| POWER_HEADROOM_1 | $-22.5 \leq PH < -22$ |
| POWER_HEADROOM_2 | $-22 \leq PH < -21.5$ |
| POWER_HEADROOM_3 | $-21.5 \leq PH < -21$ |
| ... | ... |
| POWER_HEADROOM_125 | $39 \leq PH < 39.5$ |
| POWER_HEADROOM_126 | $39.5 \leq PH < 40$ |
| POWER_HEADROOM_127 | $PH \geq 40$ |

In addition, a table for the power headroom reporting described above may be configured by combining at least two of the Embodiments 1 to 5.

<CSI Reporting Rule>

In the case of CSI reporting, a priority may be determined according to various factors. For example, when periodic CSI reporting and aperiodic CSI reporting etc. are transmitted in various schemes, a priority of CSI reporting may be set according to a specific rule, and through this, the CSI reporting can be effectively transmitted using a limited resource.

A typical equation for determining a CSI priority is as follows.

$$Pri_{tCSI}(y,k,c,s)=2 \cdot 16 \cdot M_s \cdot y + 16 \cdot M_s \cdot k + M_s \cdot c + s$$

Here, values of y, k, c, s, and M_s may be determined according to each type of CSI reporting. For example, a value of c may be different according to types of CSI reports. A case of c=1 denotes CSI reporting, and a case of c=31 denotes beam reporting.

In this case, in the case of employing such typical CSI rule, as the value of c is increased, priority itself may not be effectively set. For example, comparing with the CSI reporting, since the beam reporting has c=31 that is relatively high, while having a low priority, the beam reporting may have a higher priority value.

Further, in addition to this situation, since values of c, s and M_s in future releases may be increased, there may be a possibility that the typical priority value equation causes some problems.

To address this issue, various equations for priority calculation are provided below.

Embodiment 1

$$Pri_{CSI}(y,k,c,s)=2*32*M_s*y+32*M_s*k+M_s*c+s$$

Here, c is a number from 0 to 31. Accordingly, in the previous equation, when the coefficient is changed from 16 to 32, priority rules are always satisfied.

Embodiment 2

$$Pri_{CSI}(y,k,c,s)=2*64*M_s*y+64*M_s*k+M_s*c+s$$

Since the value of c may be increased in the future, the coefficient may be set to 64 in case the value of c is increased from 0 to 63.

Embodiment 3

$$Pri_{CSI}(y,k,c,s)=2*\text{length}(c)*M_s*y+\text{length}(c)*M_s*k+M_s*c+s$$

Thus, the coefficient may be set to depend on a length of c so that both the Embodiments 1 and 2 can be included.

Embodiment 4

$$Pri_{CSI}(y,k,c,s)=2*16*M_s*y+16*M_s*k+M_s*\log 2(c)+\log 2(s)$$

When the value of c is set to be smaller than 65536 and the value of s is smaller than $2^{\wedge M_s}$, this equation enables priority rules to be always satisfied.

$$Pri_{CSI}(y, k, c, s) = 2*16*M_s*y + 16*M_s*k + M_s*\frac{c}{2} + \frac{s}{2} \quad \text{Embodiment 5}$$

In the typical priority equation, in order to minimize changes in other values, c and s may be divided by 2.

$$Pri_{CSI}(y, k, c, s) = 2*16*M_s*y + 16*M_s*k + M_s*\frac{c}{4} + \frac{s}{4} \quad \text{Embodiment 6}$$

In the typical priority equation, in order to minimize changes in other values, c and s may be divided by 4.

Embodiment 7
$$Pri_{CSI}(y, k, c, s) = 2*2^n*M_s*y + 2^n*M_s*k + M_s*\frac{c}{2^m} + \frac{s}{2^m}$$

In the typical priority equation, in order to minimize changes in other values, c and s may be divided 2 to the power of m. Here, m is any real number.

Through various Embodiments described above, it is possible to solve the problem that a priority value and an actual priority may be different, the priority equations can be established so that they can be used even when the value of c is increased.

<SSB and PDCCH Power Offset Configuration Method>

Predetermined power offsets of a synchronization signal block (SSB) and a physical downlink control channel (PDCCH) enable Rx-AGC of a terminal. On the other hand, unlimited power offsets cause unnecessary performance degradation of the terminal. Accordingly, it is necessary to determine a range of limiting power offsets of the SSB and the PDCCH.

As described above, a synchronization signal includes in the SSB made up of a primary synchronization signal (PSS), a secondary synchronization signal (SSS) and a physical broadcast channel (PBCH).

In the LTE, the PSS uses 3 sequences indicating one or more physical layer identifiers in each group of a cell. The PSS is based on a frequency domain ZC sequence with a length of 63. The PSS is mapped to the sixth symbol in slots 0 and 10 of each radio frame in 72 subcarriers centered on the middle DC subcarrier.

The SSS is based on maximum length sequences (m-sequences), and in the LTE, the SSC1 and the SSC2 are two codes that are two different cyclic shifts of an M sequence with a single length of 31. Each SSS sequence is configured by interleaving two second synchronization codes each having a length of 31 and modulated with BPSK in the frequency domain. The two codes are alternately placed between first and second SSS transmissions in each radio frame. This allows a terminal to determine a 10 ms radio frame timing from a single observation of the SSS. Such SSS is mapped to the fifth symbol in slots 0 and 10 of each radio frame in 72 subcarriers centered on the middle DC subcarrier.

There are 1008 different physical cell identities (PCI) acquired through a synchronization signal, and a terminal can determine a PCI according to the following equation.

$$N_{ID}^{cell}=3N_{ID}^{(1)}+N_{ID}^{(2)}$$

Here, $N_{ID}^{(1)} \in \{0,1,\ldots,335\}$ and $N_{ID}^{(2)} \in \{0,1,2\}$.

Meanwhile, it is necessary for a power offset between the SSB and the PDCCH to be limited to a certain level. This helps reception automatic gain control (AGC) to be effectively performed.

To do this, a terminal may receive power offset indication information between the SSB and the PDCCH from a base station. Such indication information may be received through system information or RRC information.

For example, the terminal may receive a value with a dynamic range within 3 dB from the base station.

In another example, the terminal may receive indication information with a plurality of values within 3 dB from the base station.

In another example, the terminal may receive indication information indicating 0 or 3 dB.

Unlike this, the power offset value may be fixed.

For example, the power offset may be configured to be fixed at 3 dB in advance.

In another example, the power offset value may be configured to be fixed at any value within a range of 0 to 3 dB in advance.

<PDCCH Search Space Configuration Method>

Embodiments described below relate to methods of determining candidates dropped in a process of mapping a search space of a downlink control channel (PDCCH) in wireless communication systems.

The PDCCH may be used to transmit downlink control information. For example, the downlink control information may include scheduling information, power control command information, and the like, and may include a transport port format, HARQ information, and the like.

A terminal performs PDCCH monitoring to receive the PDCCH. To do this, the terminal monitors a search space to receive the PDCCH.

The resource assignment of the PDCCH occurs from control channel element (CCE) perspective. One CCE is made up of 9 resource element groups (REG), and one REG is made up of 4 REs. That is, a single CCE is made up of 36 REs. One PDCCH is transferred by a plurality of consecutive CCEs. The number of CCEs for the PDCCH depends on a format of the PDCCH. A relationship between the PDCCH format and the number of CCEs needed for transferring the PDCCH is as follows.

PDCCH Format 0: Requires 1 CCE=Aggregation Level 1 (2^PDCCH Format=2^0=1)

PDCCH Format 1: Requires 2 CCE=Aggregation Level 2 (2^PDCCH Format=2^1=2)

PDCCH Format 2: Requires 4 CCE=Aggregation Level 4 (2^PDCCH Format=2^2=4)

PDCCH Format 3: Requires 8 CCE=Aggregation Level 8 (2^PDCCH Format=2^3=8)

The number of consecutive CCEs needed for transferring one PDCCH is referred to as "aggregation level" Table 11 represents the PDCCH format, the number of CCEs, the number of REGs and the number of PDCCH bits.

TABLE 11

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A terminal searches a plurality of spaces to monitor a PDCCH on a PDCCH resource A possible location in which the PDCCH is transmitted is different according to whether the PDCCH is UE-specific (terminal-specific) or common, and depends on which aggregation level is used. All possible locations for the PDCCH is referred to as "search space", and each possible location is referred to as "PDCCH candidate".

The search space represents a set of CCE locations for allowing a terminal to find its PDCCH. Each PDCCH transfers one DCI and is identified by an RNTI. The RNTI is implicitly encoded in CRC attachment of the DCI.

There are two types of search spaces, that is, a common search space and a UE-specific (terminal-specific) search space. The terminal is required to monitor both the common search space and the UE-specific search space. There may occur an overlap between the common search space and the UE-specific search space for a terminal.

The common search space transfers DCI being common to all terminals. For example, the common search space may deliver system information (using SI-RNTI), paging (P-RNTI), a PRACH response (RA-RNTI) or an UL TPC command (TPC-PUCCH/PUSCH-RNTI). The terminal monitors the common search space using terminal aggregation levels 4 and 8. A maximum number of CCEs present in the common search space is 16.

The UE-specific search space may deliver a terminal-specific DCI using a C-RNTI assigned to the terminal, semi-permanent scheduling (SPS C-RNTI), or initial assignment (temporary C-RNTI). The terminal monitors the UE-specific search space in all aggregation levels (1, 2, 4 and 8).

Table 12 below represents a relationship between the search space and PDCCH candidate monitoring.

TABLE 12

| Type | Search space $S_k^{(L)}$ | | |
|---|---|---|---|
| | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In such situation, a base station may apply a PDCCH candidate mapping rule in order to transmit a PDCCH to a terminal. From terminal perspective, it may be recognized as a PDCCH candidate drop rule. Accordingly, in order to allow all of the terminal and the base station to recognize an equal PDCCH candidate mapping rule or drop rule in an equal condition, it is necessary to introduce a PDCCH candidate priority rule.

For example, the common search space (CSS) has a higher priority than the UE-specific search space (USS), and a PDCCH candidate is mapped to the CSS earlier than the USS. Due to some limitations to blind decoding and the CCE, when a CSS occurs in a slot together with a USS, a terminal monitors the CSS earlier than the USS. That is, the terminal drops PDCCH candidates for the USS prior to the CSS. Further, it is necessary to determine a PDCCH candidate priority rule in a search space set/type.

The terminal may early perform blind decoding for PDCCH candidates with a higher priority based on the PDCCH candidate priority rule. When the number of blind decodings or the number of CCEs not being overlapped exceeds based on the PDCCH candidate priority rule, the terminal drops remaining PDCCH candidates.

As such, in the 5G NR, as the number of UEs increases, it is needed to transmit a larger number of PDCCHs. Accordingly, CCEs assigned for the PDCCHs also becomes larger, and in mapping this, there may occur a case that is required to filter one or more candidates. In this case, a scheme of dropping candidates is needed.

Hereinafter, embodiments of PDCCH candidate drop schemes are discussed.

1. Preferentially drop a UE-specific search space (USS) over a common search space (CSS).

Common DCI for all terminals are delivered through the common search space. On the other hand, DCI for each terminal is delivered through the UE-specific search space. Accordingly, the common search space delivering the common DCI is preferentially transferred.

2. Preferentially drop a lower aggregation level.

Relatively larger CCE is assigned to a high aggregation level. Accordingly, if the high aggregation level is dropped, a large amount of CCE cannot be designated as candidates at once. This may cause too much CCE to be dropped. Therefore, preferentially drop a lower aggregation level.

3. Evenly drop rather than preferentially dropping a higher SS index.

Regardless of an index of a search space, drop a candidate to be evenly distributed. For example, the dropping may be performed as follows.

① In case of #SS≠n (mod 4), all drop. (n=0~3)

② In case of #SS≠n (mod 8), all drop. (n=0~7)

③ In case of #SS≠n (mod 16), all drop. (n=0~15)

4. Considering both the rule 1 and the rule 3.

Evenly distribute CSS candidates while remaining CSS candidates as much as possible. For example, in the CSS, one or more candidates are selected based on multiples of 2, and in the USS, one or more candidates are selected based on multiples of 16.

Specifically, candidates may be selected as follows.

① In the common search space, only multiples of 2 are selected as candidates, and in the UE-specific search space, only multiples of 8 are selected as candidates.

② In the common search space, only multiples of 2 are selected as candidates, and in the UE-specific search space, only multiples of 16 are selected as candidates.

In addition, candidates may be selected by combining at least two or more of the rules 1 to 4.

As described above, priorities for PDCCH candidates may be determined according to the various schemes described above.

Hereinafter, configurations of a terminal and a base station to which all of the embodiments described above can be applied will be described briefly with reference to accompanying drawings.

Figure 21:
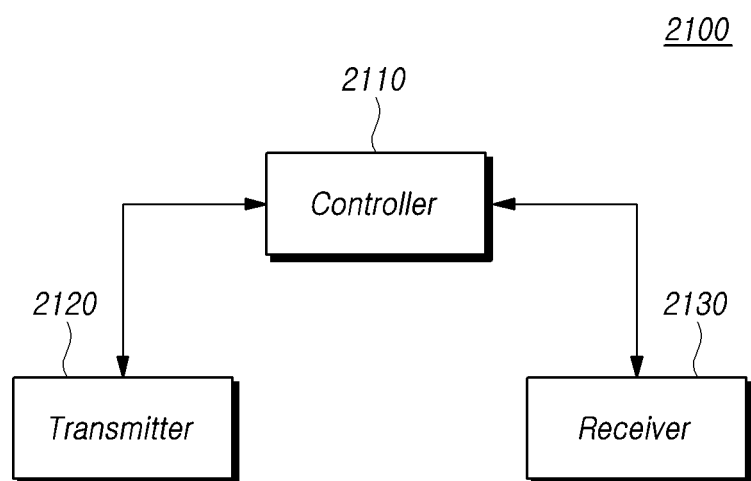
FIG. 21 is a block diagram illustrating a terminal in accordance with embodiments of the present disclosure.

FIG. 21 is a block diagram illustrating a terminal in accordance with embodiments of the present disclosure.

Referring to FIG. 21, the terminal 2100 is provided for transmitting channel state information for one or more beams, the terminal comprising: a receiver 2130 receiving CSI reporting configuration information from a base station; a controller 2110 determining whether group-based beam reporting is configured based on the CSI reporting configuration information, and measuring RSRP for one or more CSI-RSs received through one or more CSI-RS resources; and a transmitter 2120 transmitting, to the base station, channel state information including a value in a table configured in advance based on whether the group-based beam reporting is used and one or more CSI-RS RSRP measurement results.

When the group-based beam reporting parameter is set to enablement, or a value indicating the number of measured CSI-RS resources to be included in channel state information is set as a value exceeding 1, the controller 2110 may determine that the group-based beam reporting is used.

When it is determined that the group-based beam reporting is not used, the transmitter 2120 may include, in channel state information, a value of 7 bits corresponding to a section in which one CSI-RS RSRP measurement result is included from a pre-configured table in which values in the range of [−140, −44] dBm are broken down and set at 1 dB intervals, and then transmit the channel state information including the value of 7 bits.

When it is determined that the group-based beam reporting is used, the transmitter 2120 may include, in channel state information, a value of 7 bits corresponding to a section in which a CSI-RS RSRP measurement result having a largest value of a plurality of CSI-RS RSRP measurement results is included, from a table configured in advance in which values in the range of [−140, −44] dBm are broken down and set at 1 dB intervals. Further, the transmitter 2120 may include, in channel state information, remaining CSI-RS RSRP measurement results except for the CSI-RS RSRP measurement result having the largest value of the plurality of CSI-RS RSRP measurement results using a table for indicating a differential CSI-RS RSRP measurement result.

The table for indicating the differential CSI-RS RSRP measurement result may be made up of 16 sections broken down at 2 bB intervals indicating a difference from the CSI-RS RSRP measurement result having the largest value of the plurality of CSI-RS RSRP measurement results. The remaining CSI-RS RSRP measurement results may be included in the channel state information as values in 4 bits.

The CSI reporting configuration information includes group-based beam reporting parameters indicating whether group-based beam reporting is used. When the group-based beam reporting parameter is set to disablement, the group-based beam reporting parameters may further include a value indicating the number of measured CSI-RS resources to be included in channel state information.

In addition, the controller 2110 controls overall operations of terminal 2100 required to perform operations for transmitting channel state information according to whether the group-based beam reporting is used, and required to perform all or some of the embodiments of the present disclosure.

Further, the controller 2100 controls overall operations of the terminal 2100 needed for performing the embodiments of the present disclosure for the power headroom reporting, the channel state information transmission priority setting, the power offset configuration of the SSB and the PDCCH, and the PDCCH search space configuration.

The transmitter 2120 and the receiver 2130 are used to transmit, to the base station and receive from the base station, signals, messages, and data necessary for performing embodiments of the present disclosure.

Figure 22:
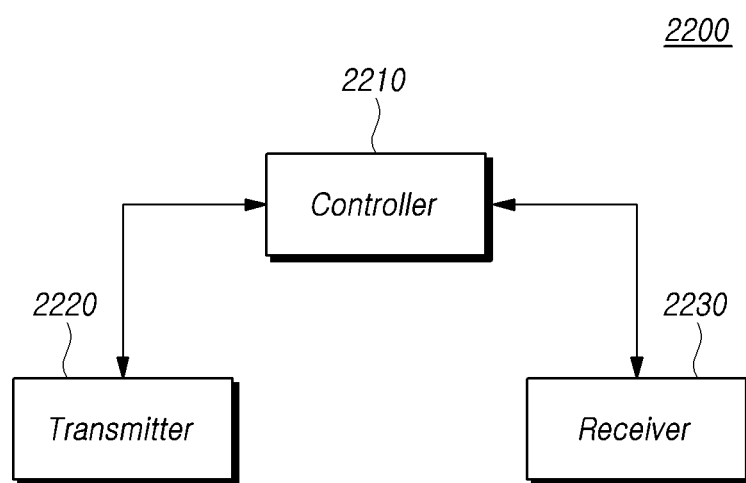
FIG. 22 is a block diagram illustrating a base station according to embodiments of the present disclosure.

FIG. 22 is a block diagram illustrating a base station according to embodiments of the present disclosure.

Referring to FIG. 22, the base station 2200 comprises: a transmitter 2220 transmitting CSI reporting configuration information to a terminal; and when it is determined that group-based beam reporting is used based on the CSI reporting configuration information, a receiver 2230 receiving channel state information including two or more CSI-RS RSRP measurement results.

The CSI-RS RSRP, such as the two or more CSI-RS RSRP measurement results, is included in the channel state information as a value in a table configured in advance in the terminal, and the table configured in advance may include a table for indicating one CSI-RS RSRP measurement result and a table for indicating at least one differential CSI-RS RSRP measurement result.

When it is determined that the group-based beam reporting is not used, the receiver 2230 may receive by including, in the channel state information, a value of 7 bits corresponding to a section in which one CSI-RS RSRP measurement result is included from a table configured in advance in which values in the range of [−140, −44] dBm are broken down and set at 1 dB intervals.

When it is determined that the group-based beam reporting is used, the receiver 2230 may receive, by including, in channel state information, a value of 7 bits corresponding to a section in which a CSI-RS RSRP measurement result having a largest value of a plurality of CSI-RS RSRP measurement results is included, from a table configured in advance in which values in the range of [−140, −44] dBm are broken down and set at 1 dB intervals. Further, the receiver 2230 may receive by including, in channel state information, remaining CSI-RS RSRP measurement results except for the CSI-RS RSRP measurement result having the largest value of the plurality of CSI-RS RSRP measurement results using a table for indicating a differential CSI-RS RSRP measurement result.

The table for indicating the differential CSI-RS RSRP measurement result may be made up of 16 sections broken down at 2 bB intervals indicating a difference from the CSI-RS RSRP measurement result having the largest value of the plurality of CSI-RS RSRP measurement results. The remaining CSI-RS RSRP measurement results may be included in the channel state information as values in 4 bits.

The CSI reporting configuration information includes group-based beam reporting parameters indicating whether group-based beam reporting is configured. When the group-based beam reporting parameter is set to disablement, the group-based beam reporting parameters may further include a value indicating the number of measured CSI-RS resources to be included in channel state information.

In addition, the controller 2210 controls overall operations of the base station 2200 required to perform operations for receiving channel state information according to whether the group-based beam reporting is used, and required to perform all or some of the embodiments of the present disclosure.

Further, the controller 2210 controls overall operations of the base station 2200 needed for performing the embodiments of the present disclosure for the power headroom reporting, the channel state information transmission priority setting, the power offset configuration of the SSB and the PDCCH, and the PDCCH search space configuration.

The transmitter 2220 and the receiver 2230 are used to transmit, to a terminal and receive from the terminal, signals, messages, and data necessary for performing embodiments of the present disclosure.

The embodiments described above may be supported by the standard documents disclosed in at least one of the wireless access systems IEEE 802, 3GPP and 3GPP2. That is, the steps, configurations, and parts not described in the present embodiments for clarifying the technical idea may be supported by standard documents described above. In addition, all terms disclosed herein may be described by the standard documents described above.

The embodiments described above may be implemented by various means. For example, the embodiments of the present disclosure may be implemented by hardware, firmware, software, or a combination thereof.

In the case of hardware implementation, the method according to embodiments may be implemented by one or more of application specific integrated circuits (ASICs), digital signal processors (DSPs), digital signal processing devices (DSPDs), programmable logic devices (PLDs) (Field Programmable Gate Arrays), a processor, a controller, a microcontroller, a microprocessor, or the like.

In the case of an implementation by firmware or software, the method according to the embodiments may be implemented in the form of an apparatus, a procedure, or a function for performing the functions or operations described above. The software code may be stored in a memory and driven by the processor. The memory may be located inside or outside of the processor, and may transmit data to the processor or receive data from the processor by various well-known means.

The terms "system", "processor", "controller", "component", "module", "interface", "model", "unit", or the like described above may generally refer to computer-related entity hardware, a combination of hardware and software, software, or running software. For example, such elements described above may be, but not limited to, a process driven by the processor, a control processor, an entity, a running thread, a program and/or a computer. For example, when an application runs on a controller or a processor, all of the application, the controller or the processor can become one element. One or more elements or components may be placed in a processor and/or an executed thread, the elements or components may be placed in one device or apparatus (e.g., a system, a computing device, etc.), or placed distributed in two or more devices or apparatuses.

The forgoing has been presented to best explain the embodiments and examples and thereby to enable any person skilled in the art to make and use the invention as claimed. Various modifications, additions and substitutions to the described embodiments and examples will be readily apparent to those skilled in the art without departing from the spirit and scope of the present disclosure. The specific embodiments and examples described herein are to be understood as particularly graceful implementations of the claimed invention in an effort to illustrate rather than limit technical principles of the present disclosure. Thus, the breadth and scope of the present disclosure should not be limited by any of the above-described embodiments and examples. Rather, the scope of protection of the present disclosure should be construed based on the following claims, and all technical ideas or principles within the scope of equivalents thereof should be construed as being included within the scope of the present disclosure.

What is claimed is:

1. A method of a terminal for transmitting channel state information for one or more beams, the method comprising:
    determining whether group-based beam reporting is configured based on channel state information (CSI) reporting configuration information;
    measuring reference signal received power (RSRP) for one or more channel state information reference signals (CSI-RS) received through one or more CSI-RS resources; and
    transmitting, to a base station, the channel state information including a value in a table configured in advance based on whether the group-based beam reporting is configured and one or more CSI-RS RSRP measurement results obtained by the measurement,
    wherein the transmitting of the channel state information to the base station is performed such that in a case that it is determined that the group-based beam reporting is used, the channel state information is transmitted by including a value of 7 bits corresponding to a section in which a CSI-RS RSRP measurement result having a largest value of the CSI-RS RSRP measurement results is included, from the table configured in advance in which values in the range of [−140, -44] dBm are broken down and set at 1 dB intervals, and including remaining CSI-RS RSRP measurement results except for the CSI-RS RSRP measurement result having the largest value of the CSI-RS RSRP measurement results using a table for indicating a differential CSI-RS RSRP measurement result, and
    wherein the CSI reporting configuration information includes at least one of a group-based beam reporting parameter indicating whether group-based beam reporting is used and a value indicating a number of the measured CSI-RS resources to be included in the channel state information, and
    wherein the determining for whether the group-based beam reporting is configured is performed such that it is determined that the group-based beam reporting is used, in a case that the value indicating the number of the measured CSI-RS resources to be included in channel state information is set as a value exceeding 1.

2. The method according to claim 1, wherein the table configured in advance includes a table for indicating the one or more CSI-RS RSRP measurement results and the table for indicating at least one differential CSI-RS RSRP measurement result.

3. The method according to claim 1, wherein the determining for whether the group-based beam reporting is configured is performed such that it is determined that the group-based beam reporting is used, in a case that the group-based beam reporting parameter is set to enablement.

4. The method according to claim 1, wherein the determining for whether the group-based beam reporting is configured is performed such that it is determined that the group-based beam reporting is not used, in a case that the group-based beam reporting parameter is set to the disablement and the value indicating the number of the measured CSI-RS resources to be included in channel state information is set as 1.

5. The method according to claim 1, wherein the transmitting of the channel state information to the base station is performed such that in a case that it is determined that the group-based beam reporting is not used, the channel state information is transmitted by including a value of 7 bits corresponding to a section in which the one CSI-RS RSRP measurement result is included from the table configured in advance in which values in the range of [−140, -44] dBm are broken down and set at 1 dB intervals.

6. The method according to claim 1,
    wherein the table for indicating the differential CSI-RS RSRP measurement result is made up of 16 sections broken down at 2 dB intervals indicating a difference from the CSI-RS RSRP measurement result having the largest value of the CSI-RS RSRP measurement results, and
    wherein the remaining CSI-RS RSRP measurement results is included as values in 4 bits.

7. A terminal for transmitting channel state information for one or more beams, the terminal comprising:
    a controller determining whether group-based beam reporting is configured based on channel state information (CSI) reporting configuration information, and measuring reference signal received power (RSRP) for one or more channel state information reference signals (CSI-RS) received through one or more CSI-RS resources; and
    a transmitter transmitting, to a base station, the channel state information including a value in a table configured in advance based on whether the group-based beam reporting is configured and one or more CSI-RS RSRP measurement results obtained by the measurement,
    wherein in a case that it is determined that the group-based beam reporting is used, the transmitter includes, in the channel state information, a value of 7 bits corresponding to a section in which a CSI-RS RSRP measurement result having a largest value of the CSI-RS RSRP measurement results is included, from the table configured in advance in which values in the range of [−140, -44] dBm are broken down and set at 1 dB intervals, and includes remaining CSI-RS RSRP measurement results except for the CSI-RS RSRP measurement result having the largest value of the CSI-RS RSRP measurement results using a table for indicating a differential CSI-RS RSRP measurement result, and
    wherein the CSI reporting configuration information includes at least one of a group-based beam reporting parameter indicating whether group-based beam reporting is used, and a value indicating a number of the measured CSI-RS resources to be included in the channel state information, wherein the determining for whether the group-based beam reporting is configured is performed such that it is determined that the group-based beam reporting is used, in a case that the value indicating the number of the measured CSI-RS resources to be included in channel state information is set as a value exceeding 1.

8. The terminal according to claim 7, wherein in a case that the group-based beam reporting parameter is set to enablement, the controller determines that the group-based beam reporting is used.

9. The terminal according to claim 7, wherein in a case that it is determined that the group-based beam reporting is not used, the transmitter transmits the channel state information including a value of 7 bits corresponding to a section in which the one CSI-RS RSRP measurement result is included from the table configured in advance in which values in the range of [−140, -44] dBm are broken down and set at 1 dB intervals.

10. The terminal according to claim 7,
wherein the table for indicating the differential CSI-RS RSRP measurement result is made up of 16 sections broken down at 2 dB intervals indicating a difference from the CSI-RS RSRP measurement result having the largest value of the CSI-RS RSRP measurement results, and
wherein the remaining CSI-RS RSRP measurement results is included as values in 4 bits.

11. The method according to claim 1,
wherein the determining for whether the group-based beam reporting is configured is performed such that it is determined that the group-based beam reporting is used, in case that the group-based beam reporting parameter is set to disablement and the value indicating the number of the measured CSI-RS resources to be included in channel state information is set as a value exceeding 1.

* * * * *